United States Patent
Grimm et al.

(10) Patent No.: US 10,799,900 B2
(45) Date of Patent: Oct. 13, 2020

(54) ELECTRIC FLUID FLOW MONITORING APPARATUS AND AGRICULTURAL FLUID APPLICATION SYSTEMS INCLUDING SAME

(71) Applicant: Capstan Ag Systems, Inc., Topeka, KS (US)

(72) Inventors: Jeffrey John Grimm, Holton, KS (US); Andrew Boyd, Lecompton, KS (US); Kale Schrader, Hiawatha, KS (US)

(73) Assignee: Capstan Ag Systems, Inc., Topeka, KS (US)

( * ) Notice: Subject to any disclaimer, the term of this patent is extended or adjusted under 35 U.S.C. 154(b) by 273 days.

(21) Appl. No.: 15/650,466

(22) Filed: Jul. 14, 2017

(65) Prior Publication Data
US 2018/0015490 A1   Jan. 18, 2018

Related U.S. Application Data

(60) Provisional application No. 62/362,849, filed on Jul. 15, 2016, provisional application No. 62/375,489, filed on Aug. 16, 2016.

(51) Int. Cl.
*B05B 12/00* (2018.01)
*G01F 15/00* (2006.01)
(Continued)

(52) U.S. Cl.
CPC .......... *B05B 12/008* (2013.01); *A01C 23/007* (2013.01); *A01C 23/024* (2013.01);
(Continued)

(58) Field of Classification Search
CPC ....... B05B 12/008; B05B 12/006; B05B 1/20; B05B 1/30; B05B 13/005; A01C 23/007;
(Continued)

(56) References Cited

U.S. PATENT DOCUMENTS

| 2,475,630 | A | 7/1949 | Melas |
| 3,203,240 | A | 8/1965 | McGrath |

(Continued)

FOREIGN PATENT DOCUMENTS

| EP | 647313 A1 | 4/1995 |
| EP | 1103792 A1 | 5/2001 |

(Continued)

*Primary Examiner* — Tuongminh N Pham
(74) *Attorney, Agent, or Firm* — Armstrong Teasdale LLP

(57) ABSTRACT

Electric fluid flow monitoring apparatus, and agricultural fluid application systems and methods including the same are described. The fluid flow monitoring apparatus generally includes a housing, a sensor assembly, and a traveler. The housing defines an interior cavity, and includes an inlet for fluid to enter the interior cavity and an outlet for fluid to exit the interior cavity. The sensor assembly is disposed in the interior cavity, and extends longitudinally in the direction of fluid flow. The traveler is movably supported by the sensor assembly such that fluid flow through the interior cavity causes the traveler to move longitudinally along the sensor assembly. The sensor assembly detects a longitudinal position of the traveler relative to the sensor assembly.

31 Claims, 10 Drawing Sheets

(51) Int. Cl.
  *B05B 1/30* (2006.01)
  *A01M 7/00* (2006.01)
  *B05B 13/00* (2006.01)
  *B05B 1/20* (2006.01)
  *G01F 1/24* (2006.01)
  *A01C 23/02* (2006.01)
  *A01C 23/00* (2006.01)

(52) U.S. Cl.
  CPC .......... *A01M 7/006* (2013.01); *A01M 7/0042* (2013.01); *A01M 7/0089* (2013.01); *B05B 1/20* (2013.01); *B05B 1/30* (2013.01); *B05B 13/005* (2013.01); *G01F 1/24* (2013.01)

(58) Field of Classification Search
  CPC ... A01C 23/024; A01M 7/0042; A01M 7/006; A01M 7/0089; G01F 1/20–26
  See application file for complete search history.

(56) References Cited

U.S. PATENT DOCUMENTS

| | | | |
|---|---|---|---|
| 3,582,662 A | 6/1971 | Soika | |
| 3,894,433 A | 7/1975 | Riester et al. | |
| 4,200,806 A | 4/1980 | Walker et al. | |
| 4,257,279 A | 3/1981 | Marx | |
| 4,335,618 A | 6/1982 | Bucsky et al. | |
| 4,523,480 A | 6/1985 | Inoue | |
| 4,619,146 A | 10/1986 | Teodorescu | |
| 4,787,253 A * | 11/1988 | deFasselle | G01D 5/06 702/45 |
| 4,787,254 A | 11/1988 | Duckworth | |
| 5,099,698 A | 3/1992 | Kath et al. | |
| 5,186,058 A | 2/1993 | Lew | |
| 5,193,400 A | 3/1993 | Lew | |
| 5,347,864 A * | 9/1994 | Senghaas | G01F 23/0069 200/84 C |
| 5,379,651 A | 1/1995 | Doolittle | |
| 6,321,604 B1 | 11/2001 | Jackson et al. | |
| 6,339,959 B1 | 1/2002 | Natapov | |
| 6,470,758 B1 | 10/2002 | Bernard et al. | |
| 6,591,694 B2 | 7/2003 | Tsai et al. | |
| 7,096,802 B1 * | 8/2006 | Kiest | A01C 23/024 111/119 |
| 7,140,262 B1 | 11/2006 | Neher et al. | |
| 7,193,233 B2 | 3/2007 | Smith et al. | |
| 7,219,559 B2 | 5/2007 | Sugi et al. | |
| 7,444,886 B2 | 11/2008 | Furkert et al. | |
| 7,469,601 B2 | 12/2008 | Sugi et al. | |
| 2002/0083768 A1 | 7/2002 | O'Shea | |
| 2003/0226407 A1 | 12/2003 | Tomita et al. | |
| 2005/0263729 A1 | 12/2005 | Smith et al. | |
| 2006/0248962 A1 * | 11/2006 | Vaughn | G01F 1/22 73/861.57 |
| 2007/0284550 A1 | 12/2007 | Smith et al. | |
| 2013/0049743 A1 | 2/2013 | Sawano | |
| 2014/0116153 A1 * | 5/2014 | Stewart | G01F 1/52 73/861 |
| 2015/0068301 A1 * | 3/2015 | Ross, Jr. | G01F 23/68 73/313 |

FOREIGN PATENT DOCUMENTS

| | | |
|---|---|---|
| EP | 1281049 A2 | 2/2003 |
| EP | 1103792 B1 | 4/2004 |
| EP | 1960745 A1 | 8/2008 |
| EP | 1970674 A1 | 9/2008 |
| WO | 1990015970 A1 | 12/1990 |
| WO | 1993020410 A1 | 10/1993 |
| WO | 2007068889 A1 | 6/2007 |

* cited by examiner

ELECTRIC FLUID FLOW MONITORING APPARATUS AND AGRICULTURAL FLUID APPLICATION SYSTEMS INCLUDING SAME

CROSS-REFERENCE TO RELATED APPLICATIONS

This application claims priority to U.S. Provisional Patent Application Ser. No. 62/362,849, filed on Jul. 15, 2016, and U.S. Provisional Patent Application Ser. No. 62/375,489, filed on Aug. 16, 2016, the disclosures of which are hereby incorporated by reference in their entirety.

BACKGROUND

The field of this disclosure relates generally to fluid handling systems and, more particularly, to electric fluid flow monitors for use in agricultural fluid application systems.

The agricultural industry commonly applies fluids, such as fertilizer, to fields during the cultivation of crops. For example, plants and plant precursors are often sprayed with an agricultural fluid at the time of planting to enhance germination and early development. In other applications, liquid fertilizers, pesticides, and other agrochemicals may be applied to plants or crops after planting for crop management. Agricultural fluids include, without limitation, growth promotors, growth regulators, spray fertilizers, pesticides, insecticides, and/or fungicides.

Some fluid application systems include flow monitoring apparatus that facilitate estimating the fluid flow rate through a fluid application system based on the position of a float or traveler within an interior cavity of a housing. Some known flow monitoring apparatus, for example, include a transparent housing, and the position of the traveler within the housing provides a visual indication of whether fluid is flowing through the fluid application system. Other known flow monitoring apparatus include magnetic or optical devices positioned on the exterior of the housing to determine the position of the traveler. Such flow monitoring apparatus, however, may be susceptible to inaccuracies in determining the position of the traveler, and further may provide less than optimal precision or resolution in determining the position of the traveler. Moreover, some flow monitoring apparatus are not compatible with existing fluid application systems, requiring significant modification or replacement of the fluid application systems to accommodate the flow monitoring apparatus.

BRIEF DESCRIPTION

In one aspect, a system for applying fluid to an agricultural field is provided. The system includes a supply tank, a fluid line connected to the supply tank, a dispensing device connected in fluid communication with the fluid line for dispensing fluid at least one of onto and into the agricultural field, and a flow monitoring apparatus connected in fluid communication with the fluid line. The flow monitoring apparatus includes a housing, a sensor assembly, and a traveler. The housing defines an interior cavity, and includes an inlet for fluid to enter the interior cavity and an outlet for fluid to exit the interior cavity. The fluid line is connected to the flow monitoring apparatus such that fluid flows through the interior cavity from the inlet to the outlet. The sensor assembly is disposed in the interior cavity, and extends longitudinally in the direction of fluid flow. The traveler is movably supported by the sensor assembly such that fluid flow through the interior cavity causes the traveler to move longitudinally along the sensor assembly. The sensor assembly detects a longitudinal position of the traveler relative to the sensor assembly.

In another aspect, a flow monitoring apparatus for detecting fluid flow through a system is provided. The flow monitoring apparatus includes a housing defining an interior cavity, a traveler disposed in the interior cavity and movable in relation to the housing, and a sensor assembly. The housing includes an inlet for fluid to enter the interior cavity and an outlet for fluid to exit the interior cavity, wherein fluid flows through the interior cavity from the inlet to the outlet. The traveler includes at least one magnet that generates a magnetic field. The sensor assembly is disposed in the interior cavity between the inlet and the outlet, and extends longitudinally in the direction of fluid flow. The sensor assembly includes a plurality of magnetic sensors spaced longitudinally along the sensor assembly, and the traveler is movably supported by the sensor assembly such that fluid flow through the interior cavity causes the traveler to move longitudinally along the sensor assembly. The sensor assembly is configured to output a traveler position signal associated with a longitudinal position of the traveler along the sensor assembly.

In yet another aspect, a sensor assembly for detecting fluid flow through a flow monitoring apparatus is provided. The sensor assembly is configured to be disposed within an interior cavity of the flow monitoring apparatus, and includes a casing having a longitudinal axis and defining an interior, a traveler movably supported on the casing such that fluid flow through the flow monitoring apparatus causes the traveler to move longitudinally along the casing, and a printed circuit board assembly disposed within the interior of the casing. The traveler includes at least one magnet that generates a magnetic field. The printed circuit board assembly includes a plurality of magnetic sensors, and is positioned within the casing such that the sensors are spaced longitudinally along the sensor assembly and are affected by the at least one magnet as the traveler moves along the casing.

In yet another aspect, a method of determining a flow rate of fluid in an agricultural fluid application system including a flow monitoring apparatus is provided. The method includes directing the fluid through an interior cavity of a housing of the flow monitoring apparatus, detecting, using a sensor assembly, a longitudinal position of a traveler within the interior cavity, and determining, using a controller communicatively connected to the sensor assembly, a flow rate based at least in part on the longitudinal position of the traveler.

In yet another aspect, a method of assembling a fluid application system including a flow monitoring apparatus is provided. The flow monitoring apparatus includes a housing defining an interior cavity and including an inlet and an outlet. The method includes connecting the housing to a fluid line such that fluid enters the interior cavity through the inlet and exits the interior cavity through the outlet, positioning a sensor assembly within the interior cavity of the housing such that fluid flows through the interior cavity in a direction substantially parallel to a longitudinal axis of the sensor assembly, the sensor assembly including a plurality of sensors spaced longitudinally along the sensor assembly, and positioning a traveler within the interior cavity such that the traveler is movably supported on the sensor assembly and such that fluid flow through the flow monitoring apparatus causes the traveler to move longitudinally along the sensor assembly, wherein the traveler activates the sensors as the traveler moves longitudinally along the sensor assembly.

In yet another aspect, a method of retrofitting a flow monitoring apparatus of an agricultural fluid application system with a sensor assembly for monitoring fluid flow through the agricultural fluid application system is provided. The sensor assembly includes a casing having a longitudinal axis and a traveler movable along the longitudinal axis of the casing. The method includes removing a previously-installed traveler from an interior cavity defined by a housing of the flow monitoring apparatus, positioning the casing of the sensor assembly within the interior cavity such that the casing extends longitudinally in the direction of fluid flow, and securing the sensor assembly to the housing such that fluid flow through the interior of the housing causes the traveler of the sensor assembly to move longitudinally along the casing of the sensor assembly.

DETAILED DESCRIPTION

Example embodiments of fluid application systems including flow monitoring apparatus are described herein. The flow monitoring apparatus generally include a housing and a traveler movably positioned within a cavity of the housing. The flow monitoring apparatus may include a sensor assembly that is configured to detect the position of the traveler within the cavity of the housing. The flow monitoring apparatus measures flow characteristics, such as flow rate, with improved sensitivity and reliability in comparison to previous flow monitoring apparatus. In some embodiments, an inner housing is positioned within the cavity. The inner housing is releasably connected to the housing such that the inner housing may be removed and interchanged with another inner housing. The inner housing may include a visual indicator that corresponds to a component, such as the nozzle assembly, of the fluid application system to facilitate an operator selecting the inner housing from a plurality of inner housings. Accordingly, the inner housing allows the flow monitoring apparatus to be easily adjusted to measure a range of flow characteristics that are appropriate for a specific configuration of the fluid application system.

Figure 1:
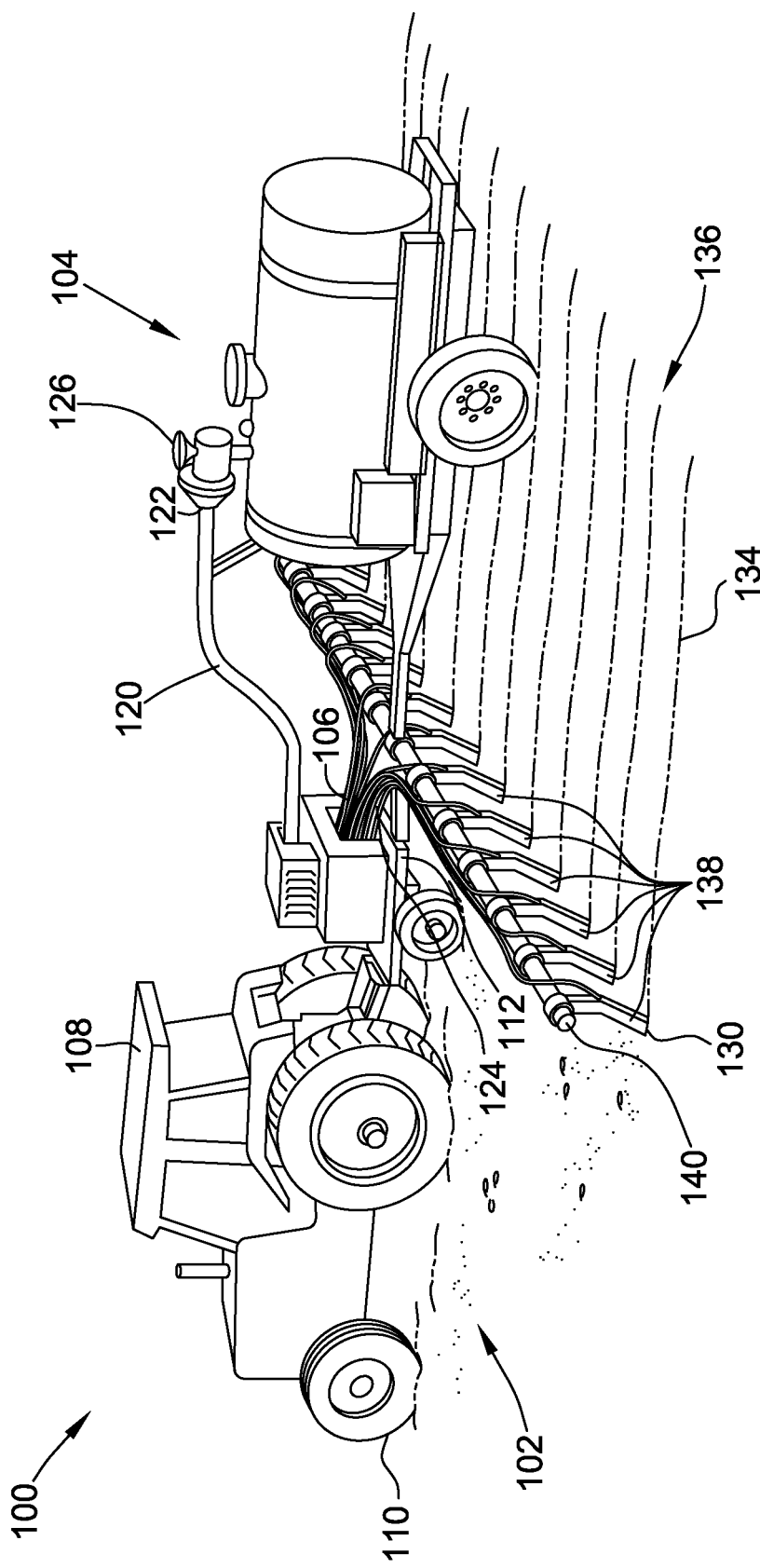
FIG. 1 is a perspective view of an embodiment of a fluid application system.
Figure 2:
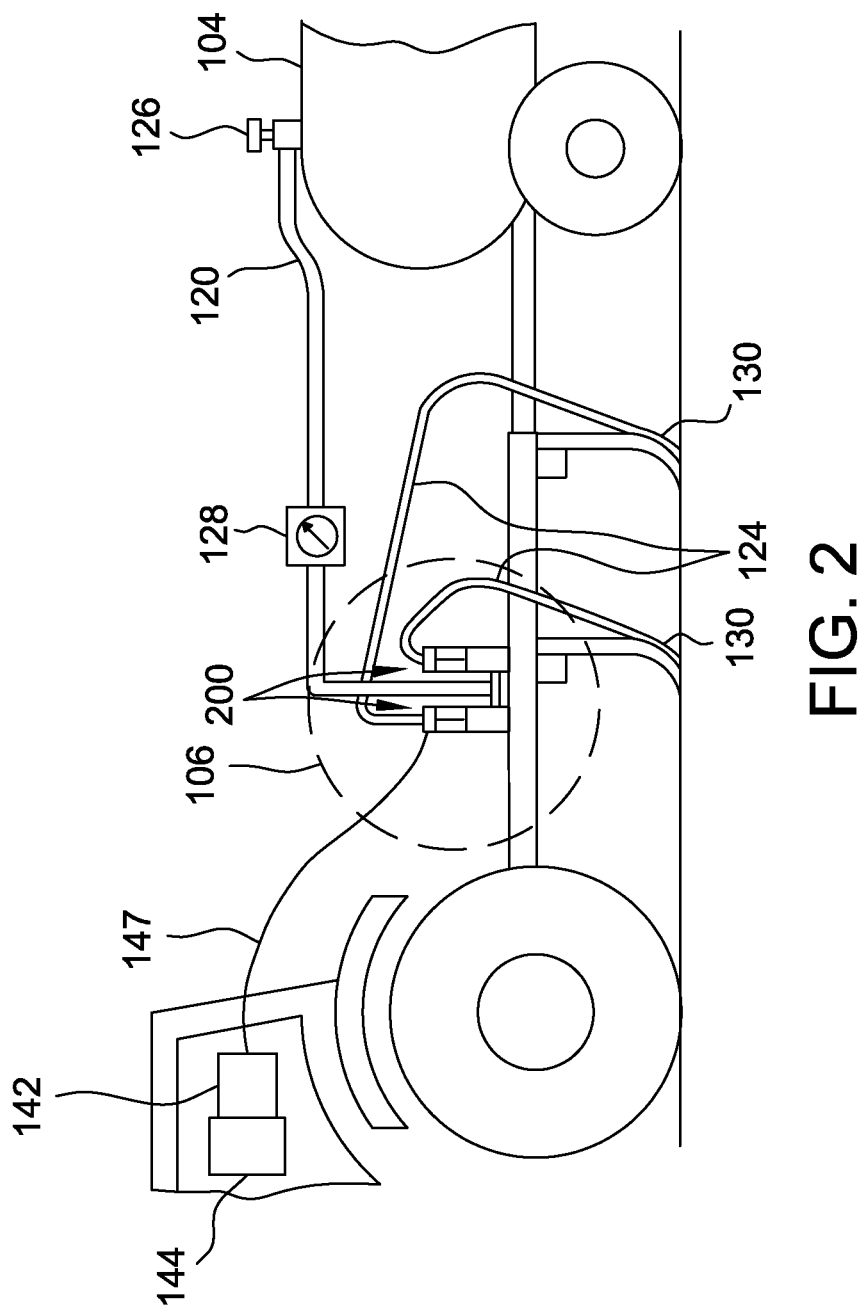
FIG. 2 is a schematic view of a portion of the fluid application system shown in FIG. 1.

Referring now to the drawings and in particular to FIGS. 1 and 2, one embodiment of an agricultural fluid application system is designated in its entirety by the reference number 100. In the example embodiment, the fluid application system 100 is an anhydrous ammonia application system including a motorized vehicle 102, a fluid storage tank 104, and a distribution manifold 106. It should be understood that flow monitoring apparatus of the present disclosure may be used in fluid application systems other than anhydrous ammonia application systems, such as liquid fertilizer systems, sprayer systems, and seed planting/spraying systems.

As shown, the motorized vehicle 102 is an agricultural tractor including a cab 108 and a plurality of wheels 110. However, in other embodiments, any other suitable aero or ground means may be provided for moving the fluid application system 100. For example, in other embodiments, the motorized vehicle 102 may not include a cab, and instead may have any suitable operator station. Further, in some embodiments, the motorized vehicle 102 and/or fluid application system 100 may include a global positioning system (e.g., a GPS receiver) for automated control and monitoring of the motorized vehicle 102 and/or the fluid application system 100.

In the illustrated embodiment, the fluid storage tank 104 and the distribution manifold 106 are disposed on a wheeled chassis 112 towed behind the motorized vehicle 102. In other embodiments, the motorized vehicle 102 may transport components of the fluid application system 100 in any manner that enables the fluid application system 100 to function as described herein. For example, in some suitable embodiments, one or more components of the fluid application system 100 may be incorporated into the motorized vehicle 102 without departing from some aspects of this disclosure.

The fluid storage tank 104 may contain any type of fluid for distribution by the fluid application system 100. For example, the tank 104 may hold a fluid 114 (shown in FIG. 5), such as a liquid, a mixture of liquid and powder, a volatile fluid, a gas, a mixture of liquid and gas, or other product. The fluid 114 may be a quantity of water or an agrochemical such as a fertilizer (e.g., anhydrous ammonia) or a pesticide, and may be sprayed or dispensed onto, for example, a crop, produce, and/or the ground itself.

In reference to FIG. 2, the fluid storage tank 104 is fluidly connected to a distribution manifold 106 by a fluid line 120. Disposed between the distribution manifold 106 and the fluid storage tank 104 is a quick connect 122 (shown in FIG. 1), a valve 126, and a fluid transport device 128. In suitable embodiments, the quick connect 122, the valve 126, and the fluid transport device 128 may be coupled to any portions of the fluid application system 100 or may be omitted without departing from some aspects of this disclosure. In the example embodiment, the quick connect 122 facilitates connecting and disconnecting the fluid storage tank 104 to and from the fluid line 120. The valve 126 controls fluid flow through the fluid line 120, and the fluid transport device 128 directs fluid flow through the fluid line 120 from the fluid storage tank 104 to the distribution manifold 106. In some embodiments, the fluid transport device 128 includes a pump such as, for example and without limitation, a positive displacement pump and a centrifugal pump. In suitable embodiments, any additional components may be disposed along the fluid line 120 that enable the fluid application system 100 to function as described herein. For example, the fluid application system 100 may include any of the following: a shutoff valve, a line breakaway, an excess flow valve, a reverse flow valve, a metering device, and a strainer.

During operation, fluid stored within the tank 104 is directed from the fluid line 120 into the distribution manifold 106. The distribution manifold 106 includes a plurality of flow monitoring apparatus 200 and a plurality of supply lines 124. Each supply line 124 is connected to one of the flow monitoring apparatus 200. The fluid is directed through the flow monitoring apparatus 200 into the supply lines 124. As will be described in more detail below, each flow monitoring apparatus 200 is configured to detect characteristics of fluid flow, such as volumetric flow rate.

Figure 3:
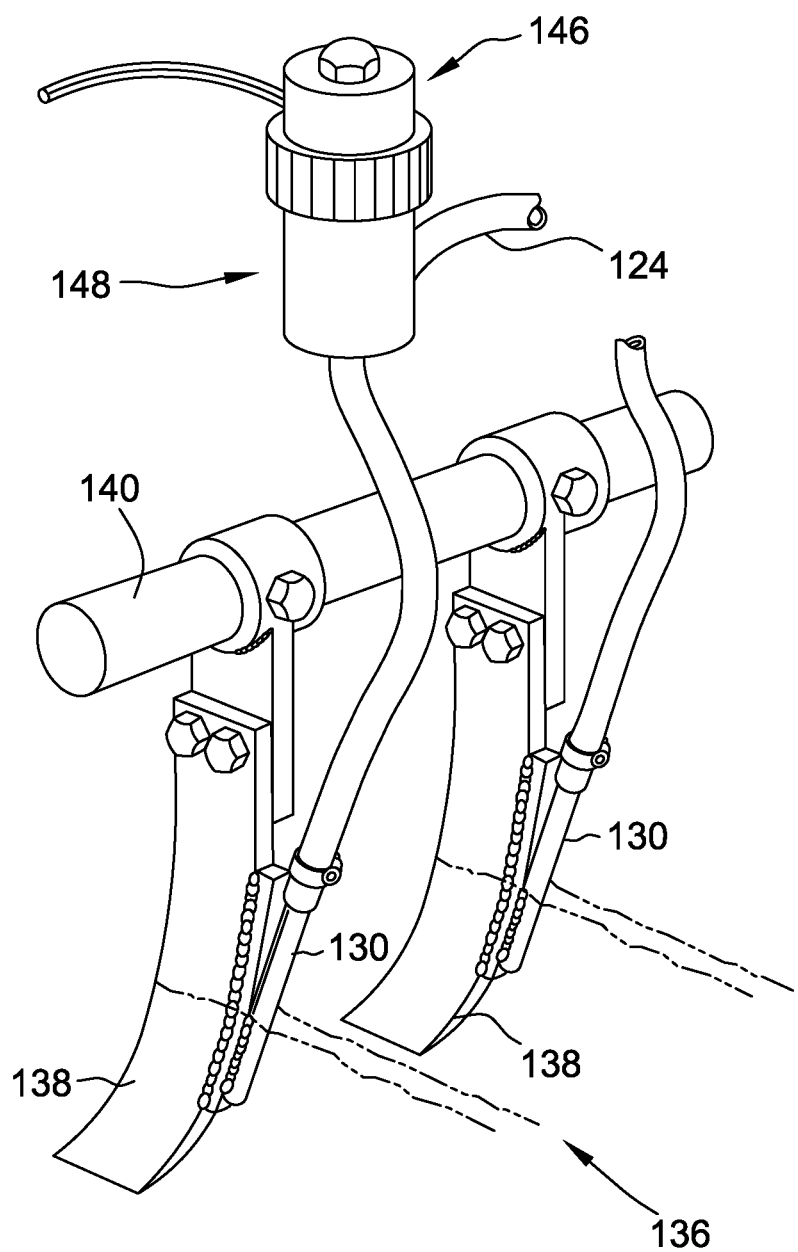
FIG. 3 is an enlarged view of a portion of the fluid application system shown in FIG. 1.

In reference to FIG. 3, a plurality of valve assemblies 146 are connected to the supply lines 124. In the example embodiment, each valve assembly 146 regulates fluid flow through a valve body 148 and into a dispensing tube 130 for injecting the fluid into a soil. In other embodiments, a single valve or valve assembly may control fluid flow to a plurality of dispensing tubes or dispensing devices. Moreover, in some embodiments, the valve assemblies 146 include a pulse-width modulated valve, such as a direct acting solenoid valve. Moreover, in some embodiments, the valve assemblies 146 include spray nozzles or orifices configured to produce a desired spray pattern.

The distribution manifold 106 distributes the fluid to the valve assemblies 146 and the dispensing tubes 130 for emitting the fluid from the fluid application system 100. In suitable embodiments, the fluid application system 100 may include any number of the dispensing tubes 130.

As shown in FIG. 1, in some embodiments, as the fluid is emitted from the dispensing tubes 130, the vehicle 102 moves the fluid application system 100 along a desired path for fluid application, such as rows 134 of a field 136. In the example embodiment, the dispensing tubes 130 are connected to or positioned behind a soil preparation mechanism 138, such as a knife or plow, that contacts the soil as the dispensing tubes 130 dispense fluid onto and/or into the soil. The soil preparation mechanisms 138 are connected to a boom 140, which is connected to and pulled behind the vehicle 102. In other embodiments, such as spraying systems, soil preparation mechanisms may be omitted.

In reference to FIGS. 1-3, the fluid 114 (shown in FIG. 5) flows through the valve assemblies 146 and may be applied to the field 136 in various ways. For example, the fluid 114 may flow from valve assemblies 146 in a pulsed pattern. In suitable embodiments, the system 100 may include any other suitable ground application devices to provide varying effects of placement of fluid 114 on top or below a soil surface of the field 136, such as via pipes, knives, coulters, and the like.

In certain embodiments, the valve assemblies 146 may include nozzles equipped with direct acting solenoid valves and the system 100 may include a pump, transducers to measure fluid pressure and fluid flow, sectional regulating valves, and a pressure and/or flow controller.

As shown in FIG. 2, the fluid application system 100 also includes a controller 142 and a user interface 144 connected to the controller 142. The controller 142 may be any controller that enables the fluid application system 100 to function as described herein.

Moreover, in some embodiments, the controller 142 may be connected to and configured to send signals to and receive signals from any components of the fluid application system 100. The signals may relate to controlling operation of any of the components connected to the controller 142. In some embodiments, the controller 142 controls operation of components based at least in part on inputs of the operator. In further embodiments, the controller 142 may automatically control some operations of the fluid application system 100 based at least in part on signals received from components of the fluid application system 100.

The controller 142 may receive signals that include information relating to any operating characteristics of the fluid application system 100. For example, the controller 142 may receive information including, without limitation, flow characteristics, pressures, temperatures, duty cycles, densities, valve positions, global positioning system (GPS) data, and any other suitable characteristics of the fluid application system 100.

In suitable embodiments, the controller 142 may perform any functions based on the signals received from components of the fluid application system 100. For example, the controller 142 may perform at least one of the following functions: triggering an indicating alarm, stopping fluid flow through the fluid line 120, and/or regulating fluid flow through the fluid line 120 by controlling one or more components of the fluid application system 100.

In the example embodiment, the controller 142 may receive signals from and send signals to the flow monitoring apparatus 200. For example, the controller 142 may receive signals from the flow monitoring apparatus 200 relating to flow rate of fluid through the flow monitoring apparatus, and compare the detected flow rate to a stored target or desired flow rate. The controller 142 may adjust operation of the fluid application system based on differences between the detected flow rate and the target flow rate. Moreover, the controller 142 may compare information from a plurality of the flow monitoring apparatus 200 to determine flow rates through different portions of the fluid application system 100. Based on the comparisons, the controller 142 may calibrate components of the fluid application system 100. In the illustrated embodiment, the controller 142 and the flow monitoring apparatus 200 are connected by a cable 147 and may communicate via the cable 147. In other embodiments, the controller 142 and the flow monitoring apparatus 200 may communicate wirelessly.

In suitable embodiments, the controller 142 may use information received from the flow monitoring apparatus 200 to maintain a selected flow rate in the fluid application system 100. For example, the controller 142 may adjust valve assemblies 146 or other components of fluid application system 100 based on information received from the flow monitoring apparatus 200. When the flow monitoring apparatus 200 determines that a setpoint associated with the selected flow rate has been reached, the flow monitoring apparatus 200 may send a signal to the controller 142. Then, the controller 142 may regulate the valve assemblies 146 or other components of fluid application system 100 to maintain the selected flow rate. In some embodiments, the controller 142 may maintain a global flow rate through the fluid line 120 and maintain individual flow rates through each valve assembly 146. Each flow monitoring apparatus 200 may have an individual setpoint to facilitate the controller 142 maintaining the multiple flow rates. In suitable embodiments, the controller 142 can utilize information from any sensors, such as pressure sensors, to regulate components of the fluid application system 100.

Controller 142 may generally comprise any suitable computer and/or other processing unit, including any suitable combination of computers, processing units and/or the like that may be communicatively coupled to one another (e.g., controller 142 may form all or part of a controller network). Thus, controller 142 may include one or more processor(s)

and associated memory device(s) configured to perform a variety of computer-implemented functions (e.g., performing the methods, steps, calculations and/or the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of controller 142 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure controller 142 to perform various functions including, but not limited to, receiving a signal from one or more sensors associated with the height of a traveler, determining the height of a traveler within the housing of a flow monitoring apparatus, calculating the volumetric flow rate through a flow monitoring apparatus based on the height of a traveler, receiving operator inputs, performing the calculations, algorithms and/or methods described herein and various other suitable computer-implemented functions.

In the example embodiment, the controller 142 sends information, such as flow characteristics and diagnostic data, to the user interface 144 for presentation to and interpretation by an operator. The user interface 144 may be any suitable interface that allows the operator to receive the information. For example, the user interface 144 may include a display device mounted in the vehicle 102 to display the information for the operator. In further embodiments, the user interface 144 may be a mobile computing device wirelessly connected to the controller 142. In suitable embodiments, the user interface 144 may allow the operator to input values and/or to control components of the fluid application system 100. The user interface 144 may be coupled to the controller 142 such that commands from the user interface 144 are relayed to the controller 142 and/or other components of the fluid application system 100.

In some embodiments, the user interface 144 is configured to receive fluid characteristics and/or traveler characteristics as user inputs. Fluid characteristics include, for example and without limitation, specific gravity, density, viscosity, and a specific type of fluid (e.g., anhydrous ammonia). Traveler characteristics include, for example and without limitation, a mass or weight of the traveler, a shape of the traveler, and a drag coefficient associated with the shape of the traveler. In some embodiments, the controller 142 is configured to calculate one or more values based on the user inputs including, for example and without limitation, a fluid flow velocity needed to generate a drag force equal to the gravitational force on the traveler and a volumetric flow rate.

Figure 4:
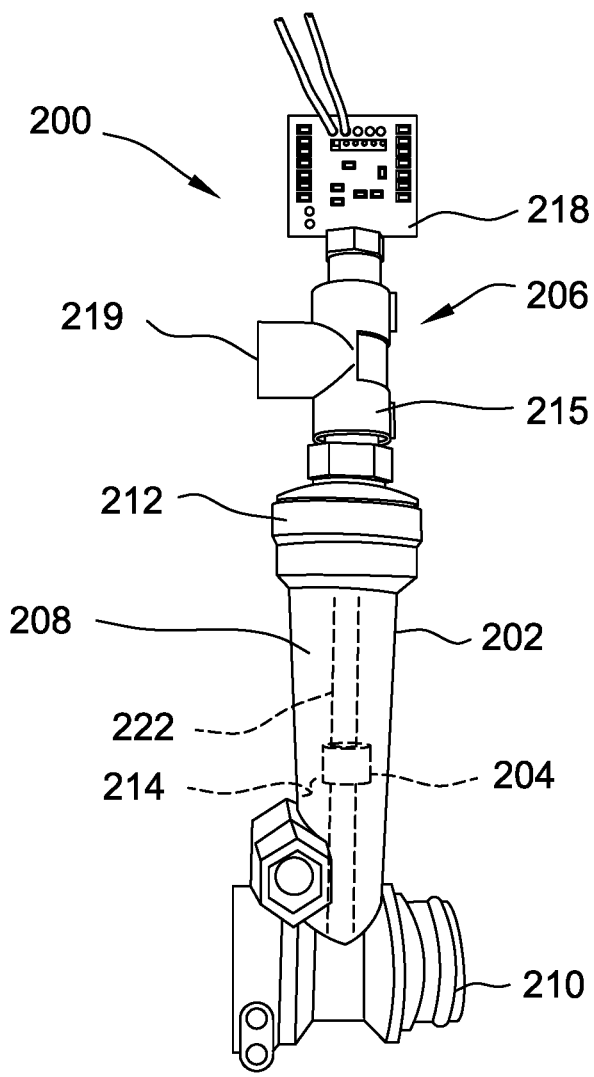
FIG. 4 is a front view of a flow monitoring apparatus suitable for use in the fluid application system shown in FIG. 1.
Figure 5:
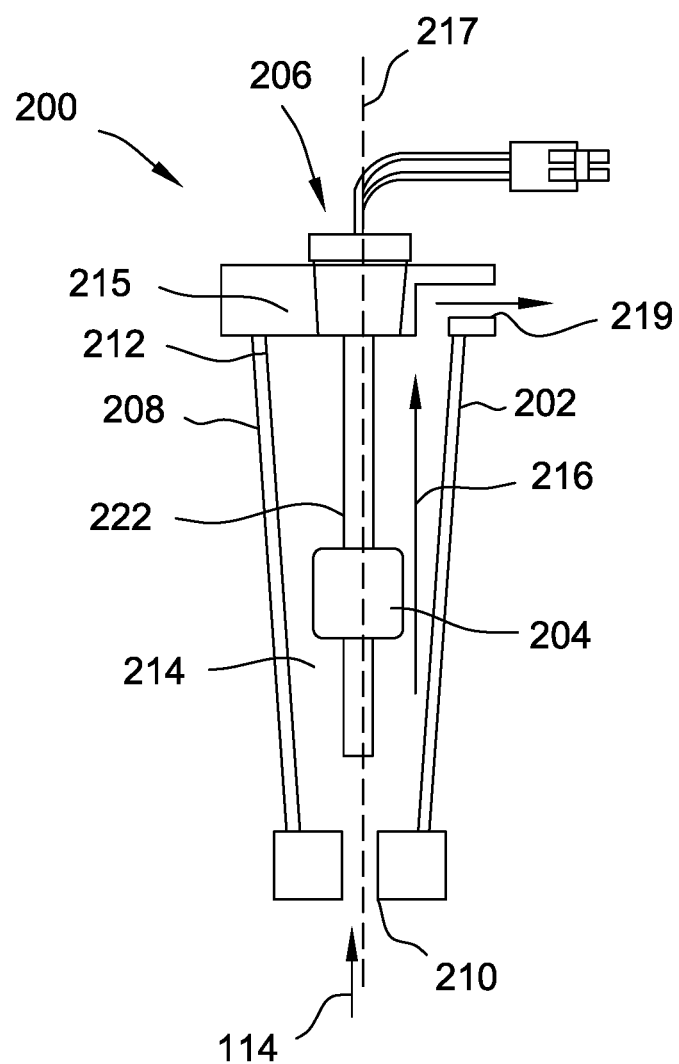
FIG. 5 is a schematic sectional view of the flow monitoring apparatus shown in FIG. 4.
Figure 6:
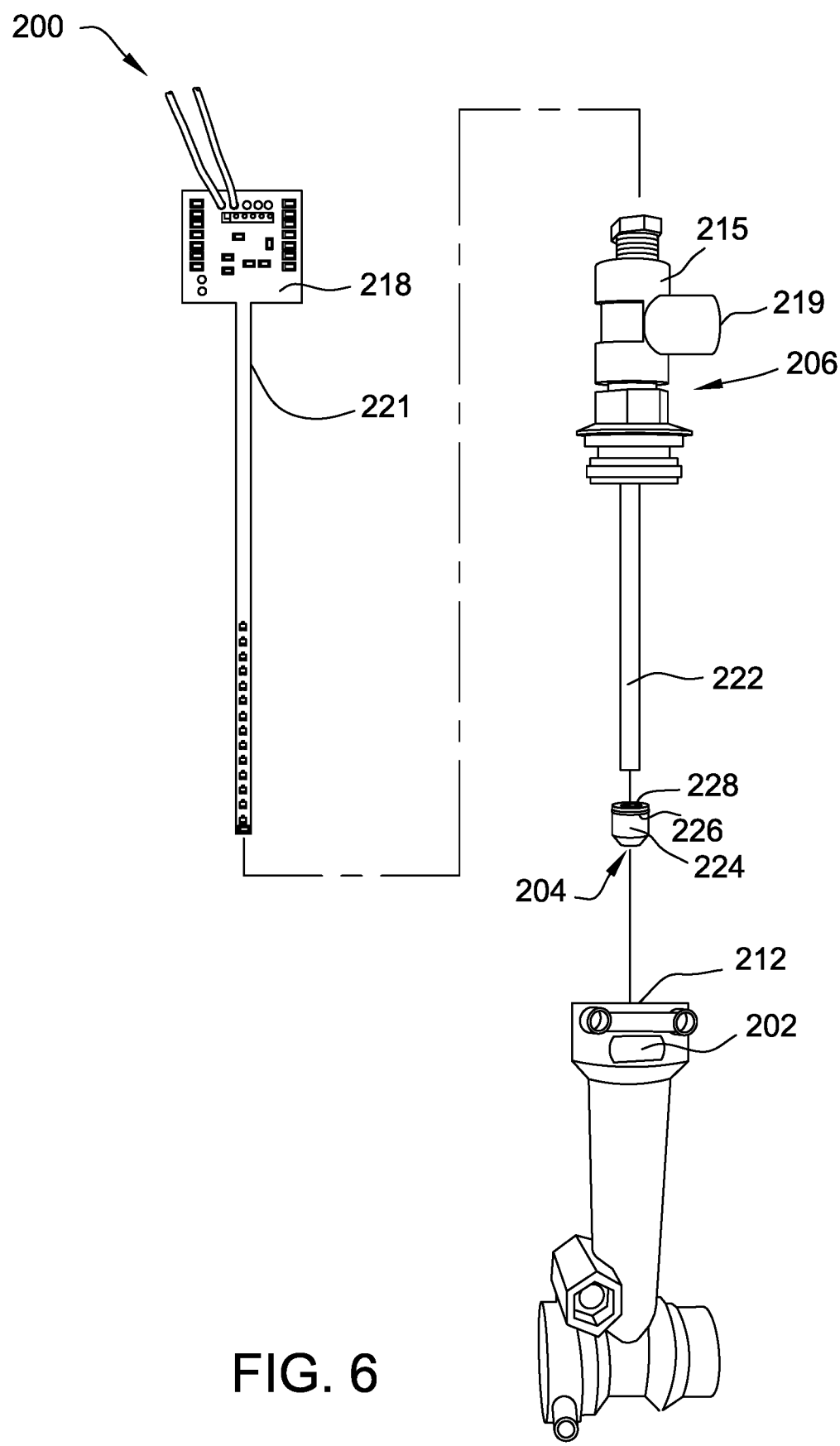
FIG. 6 is another front view of the flow monitoring apparatus shown in FIG. 4 in a disassembled state.

With reference to FIGS. 4-6, the flow monitoring apparatus 200 includes a housing 202, a traveler 204 (interchangeably referred to herein as a traveler), and a sensor assembly 206. The housing 202 includes a sidewall 208, an inlet 210, and an outlet 212. The sidewall 208 defines an interior cavity 214. The housing 202 is configured to be connected in fluid communication with the fluid line 120 (shown in FIG. 2) and the supply lines 124 (shown in FIG. 2) to allow fluid to flow through the interior cavity 214. In particular, the inlet 210 may be connected to the fluid line 120 (shown in FIG. 2), either directly or through one or more intermediate fluid conduits, and the outlet 212 may be connected to one of the supply lines 124 (shown in FIG. 2) such that fluid enters the interior cavity 214 through the inlet 210 and exits the interior cavity 214 through the outlet 212. In some embodiments, a pulsing valve such as a solenoid valve may be connected to the flow monitoring apparatus 200 to regulate fluid flow through the fluid monitoring apparatus and/or the fluid lines connected to the flow monitoring apparatus. The fluid flows through the interior cavity 214 in a flow direction, indicated by arrow 216 in FIG. 5, from the inlet 210 to the outlet 212. In the illustrated embodiment, the flow monitoring apparatus 200 is oriented in a vertical direction such that the outlet 212 is above the inlet 210. In other embodiments, the flow monitoring apparatus 200 may be oriented in any manner that enables the flow monitoring apparatus 200 to operate as described herein. For example, in some embodiments, the flow monitoring apparatus 200 may be oriented horizontally such that fluid flows through the flow monitoring apparatus 200 in a horizontal direction. In such embodiments, the flow monitoring apparatus may include one or biasing elements (e.g., helical or coil springs) that bias the traveler against the direction of fluid flow.

In the illustrated embodiment, the housing 202 has a conical shape. Accordingly, the interior cavity 214 has a varying cross-sectional area. In particular, the cross-sectional area of the interior cavity 214 increases from the inlet 210 to the outlet 212. In other embodiments, the housing 202 has any suitable shape that enables the flow monitoring apparatus 200 to operate as described herein.

The housing 202 may be constructed from a variety of suitable materials, including, for example and without limitation, plastics, such as polycarbonate, polypropylene, polyethylene; ceramics, such as glass; and metals, such as brass, aluminum, and stainless steel. In some embodiments, the housing 202 is constructed from transparent or translucent materials such that the traveler 204 and the sensor assembly 206 can be seen from the exterior of the housing 202. In other embodiments, the housing 202 may be constructed from opaque materials such that the interior cavity 214, the traveler 204, and/or the sensor assembly 206 are not visible from the exterior of the housing 202. Further, in some embodiments, the housing 202 may be constructed of ferrous materials, including, for example and without limitation, steel. In contrast to at least some known flow monitoring apparatus, the configuration of the flow monitoring apparatus 200 inhibits or limits interference between components constructed of ferrous material, such as the housing 202, and the sensor assembly 206.

As shown in FIGS. 4-6, the sensor assembly 206 includes an adapter body 215 and a cylindrical sleeve or casing 222 that extends from the adapter body 215. The adapter body 215 is configured for connection to one of the housing inlet 210 and the housing outlet 212 to form a fluid tight seal therewith. In the example embodiment, the adapter body 215 is configured for connection to the housing outlet 212, and includes an adapter body outlet 219 that connects to one of the supply lines 124 to provide fluid flow between the interior cavity 214 of the housing 202 and the supply line 124. As shown in FIGS. 4 and 5, when the adapter body 215 is connected to the housing 202, the sensor assembly 206 (specifically, the casing 222) extends into the interior cavity 214 between the inlet 210 and the outlet 212 such that a longitudinal axis 217 of the sensor assembly 206 is substantially parallel to the flow direction 216.

In some embodiments, the casing 222 is sized and shaped to facilitate retrofitting existing flow monitoring apparatus with the electric fluid flow monitoring apparatus of the present application. In some embodiments, for example, the casing 222 has an outer diameter no greater than 1 inch, no greater than ½ of an inch, no greater than ⅜ of an inch, and even no greater than ¼ of an inch. In some embodiments, the casing 222 has an outer diameter of between about ⅛ of an inch and about ⅜ of an inch.

Figure 7:
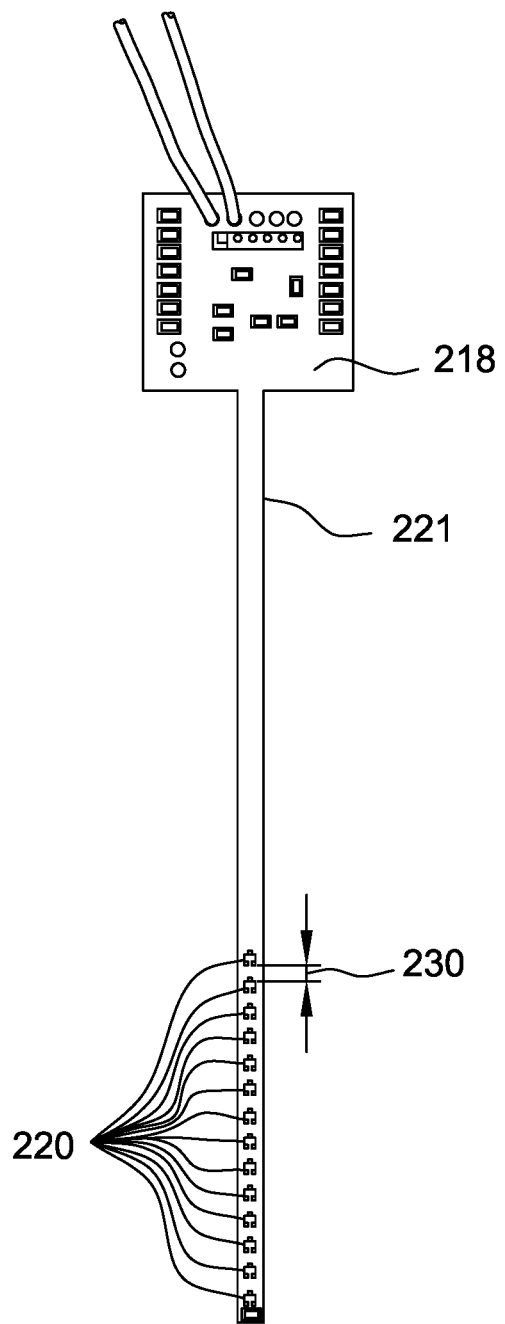
FIG. 7 is a front view of a printed circuit board assembly of the flow monitoring apparatus shown in FIG. 4.

As shown in FIGS. 4, 6, and 7, the sensor assembly 206 also includes traveler position detection circuitry implemented on a printed circuit board (PCB) assembly 218. As shown in FIG. 7, the traveler position detection circuitry includes a plurality of sensors 220 connected to or otherwise fabricated along a narrow profile section 221 of the PCB assembly 218. The sensors 220 are spaced longitudinally along the narrow profile section 221. When the flow monitoring apparatus 200 is assembled, as shown in FIG. 4, the narrow profile section 221 of the PCB assembly 218 is positioned within an interior of the casing 222 such that the sensors 220 are spaced longitudinally along the sensor assembly 206. As described in more detail herein, the sensors 220 in the example embodiment are magnetic sensors (e.g., magnetically-activated or -affected sensors) that are responsive to or affected by a magnetic field produced by the traveler 204. In alternative embodiments, the flow monitoring apparatus 200 may include any suitable type of sensor that enables the flow monitoring apparatus 200 to operate as described herein.

As shown in FIG. 5, the traveler 204 is disposed in the interior cavity 214 and is movably supported by the sensor assembly 206 (specifically, the cylindrical casing 222). In particular, the traveler 204 includes a body 224 and a magnet 226 (shown in FIG. 6). In some embodiments, the magnet 226 is integrally formed with the traveler body 224. In some embodiments, for example, the traveler 204 is constructed of magnetic materials, including, for example and without limitation, ferromagnetic materials, iron alloys, steel alloys, ferrite, and combinations thereof. In further embodiments, the magnet is axially magnetized, i.e., the poles of the magnet are spaced axially. In some embodiments, the magnet 226 may be embedded in or otherwise attached to a non-magnetic or magnetic body 224.

The traveler body 224 also defines an opening 228 sized and shaped to receive the cylindrical casing 222 therein such that the traveler 204 is movable along the casing 222 in a direction parallel to the sensor assembly longitudinal axis 217. The body 224 may have any suitable shape that enables the traveler 204 and sensor assembly 206 to function as described herein. In the illustrated embodiment, the body 224 is substantially cylindrical with a conical end, and extends annularly around the sensor assembly 206 (specifically, the cylindrical casing 222). In some embodiments, a biasing member (not shown), such as a spring, biases the traveler 204 towards a specific position on the sensor assembly 206. In some embodiments, the biasing member is connected to the traveler 204 and biases the traveler 204 against the direction of fluid flow.

Although the traveler 204 may be referred to herein as a float, those skilled in the art will appreciate that the traveler 204 need not float in operation. In some embodiments, for example, the traveler sinks in the absence of fluid flow through the interior cavity 214 of the housing 202. In particular, the traveler 204 may have a density or specific gravity greater than the fluids used with the fluid application system 100. In some embodiments, for example, the traveler 204 has a density greater than 1.0 g/cm³. As noted above, the traveler 204 may be interchangeably referred to as a float.

In suitable embodiments, the magnet 226 (shown in FIG. 6) may be any magnet that enables the flow monitoring apparatus 200 to operate as described herein. In the example embodiment, the magnet 226 generates or produces a magnetic field that activates the sensors 220. In some embodiments, the magnet 226 may produce a magnetic field with a magnetic flux density of between about 3,000 Gauss (G) and about 30,000 G, between about 5,000 G and about 20,000 G, between about 5,000 G and about 15,000 G, between about 10,000 G and about 30,000 G, between about 10,000 G and about 20,000 G, or between about 10,000 G and about 15,000 G. In further embodiments, the magnetization of the magnet 226 and, therefore, the magnetic field of the magnet 226 may be adjusted. For example, the magnet 226 may be magnetized or demagnetized to adjust the magnetic flux of the magnetic field.

In operation, the traveler 204 moves longitudinally along the sensor assembly 206 (specifically, the cylindrical casing 222) as fluid flows through the interior cavity 214. Generally, the traveler 204 is moved within the interior cavity 214 by a drag force created by fluid flowing around the traveler 204. The drag force is proportional to the velocity of the fluid, which is proportional to the volumetric flow rate of the fluid and inversely proportional to the cross-sectional area of the housing 202. Thus, for a given volumetric flow rate, the velocity of the fluid gradually decreases from the inlet 210 to the outlet 212 because the cross-sectional area of the interior cavity 214 gradually increases in the flow direction 216. The traveler 204 will be moved by the fluid and settle at a position where the drag force from the fluid and the opposing forces acting on the traveler 204 (e.g., gravity, biasing elements, etc.) are at equilibrium. In the example embodiment, the gravitational force acting on the traveler 204 is the only force opposing the drag force, although other embodiments may include additional opposing forces, such as an opposing force resulting from a biasing element that biases the traveler 204 against the direction of fluid flow.

When the volumetric flow rate through the interior cavity 214 increases, the average fluid flow velocity within the interior cavity 214 will increase, exerting a greater drag force on the traveler 204. The increased drag force will cause the traveler 204 to rise until the traveler 204 reaches a position at which the drag force is in equilibrium with the gravitational force on the traveler 204. Similarly, when the volumetric flow rate through the interior cavity 214 decreases, the average fluid flow velocity within the interior cavity 214 will decrease, exerting a lower drag force on the traveler 204. The reduced drag force will cause the traveler 204 to drop until the traveler 204 reaches a position at which the drag force is again in equilibrium with the gravitational force on the traveler 204.

In some embodiments, such as systems that include pulsing nozzles, the inertia of the traveler 204 may also affect the position of the traveler 204 along the sensor assembly 206. In such embodiments, fluid flow information may be determined based on the dynamic displacement or "jump distance" of the traveler 204 resulting from fluctuations in fluid flow caused by the pulsing nozzles.

In the example embodiment, the drag force needed to maintain the traveler at a position or height within the interior cavity 214 is generally equal to the gravitational force on the traveler 204. Thus, for a traveler of a given configuration (e.g., shape, mass, surface finish, etc.) and a fluid with given fluid characteristics (e.g., mass density, drag coefficient) the fluid flow velocity needed to generate a drag force equal to the gravitational force on the traveler can be calculated using known relationships between fluid flow velocity and drag force (e.g., the drag equation). Because the gravitational force on the traveler is constant, the corresponding fluid flow velocity needed to generate an equilibrium drag force will also be generally constant regardless of the volumetric flow rate through the interior cavity 214. Thus, if the height of the traveler and the corresponding cross-sectional area of the housing are known, the volumetric flow rate through the interior cavity can be calculated by multiplying the fluid flow velocity by the effective cross-sectional area of the housing through which the fluid is permitted to flow.

In the example embodiment, the sensor assembly 206 determines the position of the traveler 204 based on a magnetic interaction between the sensors 220 and the magnetic field generated by the magnet 226, as described in more detail herein. In addition, in some embodiments, the sensor assembly 206 is configured to output a traveler position signal associated with a longitudinal position of the traveler 204 along the sensor assembly. In alternative embodiments, the sensor assembly 206 determines the position of the traveler 204 in any manner that enables the flow monitoring apparatus 200 to operate as described herein. For example, in some embodiments, the traveler 204 is non-magnetic, and the sensor assembly 206 is configured to detect the position of the traveler 204 via non-magnetic means, such as Hall effect sensors, capacitive sensors, inductive sensors, and combinations thereof.

In suitable embodiments, the position of the traveler 204 may be used to determine values relating to fluid flow. For example, the volumetric flow rate through the interior cavity 214 of the housing 202 can be determined based on the height of the traveler 204. In one embodiment, for example, the height of the traveler 204 is determined and used to calculate the volumetric flow rate by multiplying an effective cross-sectional area associated with the height of the traveler 204 by a known fluid flow velocity needed to generate an equilibrium drag force on the traveler 204. In another embodiment, the volumetric flow rate is determined using a look up table including traveler height values and corresponding volumetric flow rates. The cross-sectional area of the interior cavity 214 is measured within a plane perpendicular to the flow direction 216 at the position of the traveler 204. The effective cross-sectional area refers to the cross-sectional area through which fluid is permitted to flow, and can be determined based on the shape and size of the housing 202, the shape, size, and position of the traveler 204, and the shape and size of the casing 222. In some embodiments, calculations of the cross-sectional area, the velocity, and the flow rate can be combined into a single algorithm that is programmed into the controller 142. In alternative embodiments, the volumetric flow rate may be calculated in any manner that enables the fluid application system 100 to operate as described herein.

Additionally or alternatively, the position of the traveler 204 may be used to present information other than volumetric flow rate to a user of the system 100. In some embodiments, for example, the controller 142 is configured to output an alert or alarm to a user of the system 100 in response to detecting a fluid flow anomaly or irregularity in the system 100 based on a comparison of the heights (or corresponding output signals) of the travelers from a plurality of flow monitoring apparatus 200. Moreover, in some embodiments, the controller 142 is configured to display the height(s) of one or more travelers 204 on a display device of the user interface 144.

Figure 8:
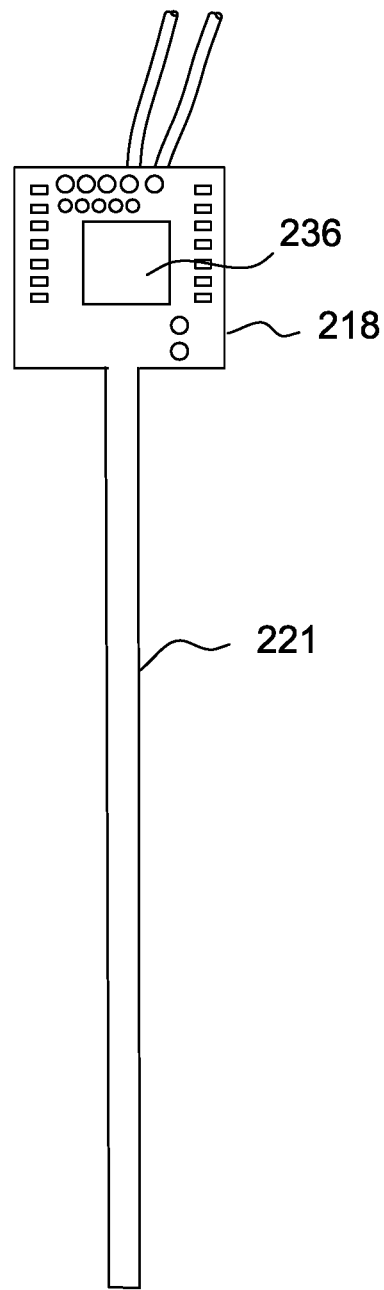
FIG. 8 is a rear view of the printed circuit board assembly shown in FIG. 7.
Figure 9:
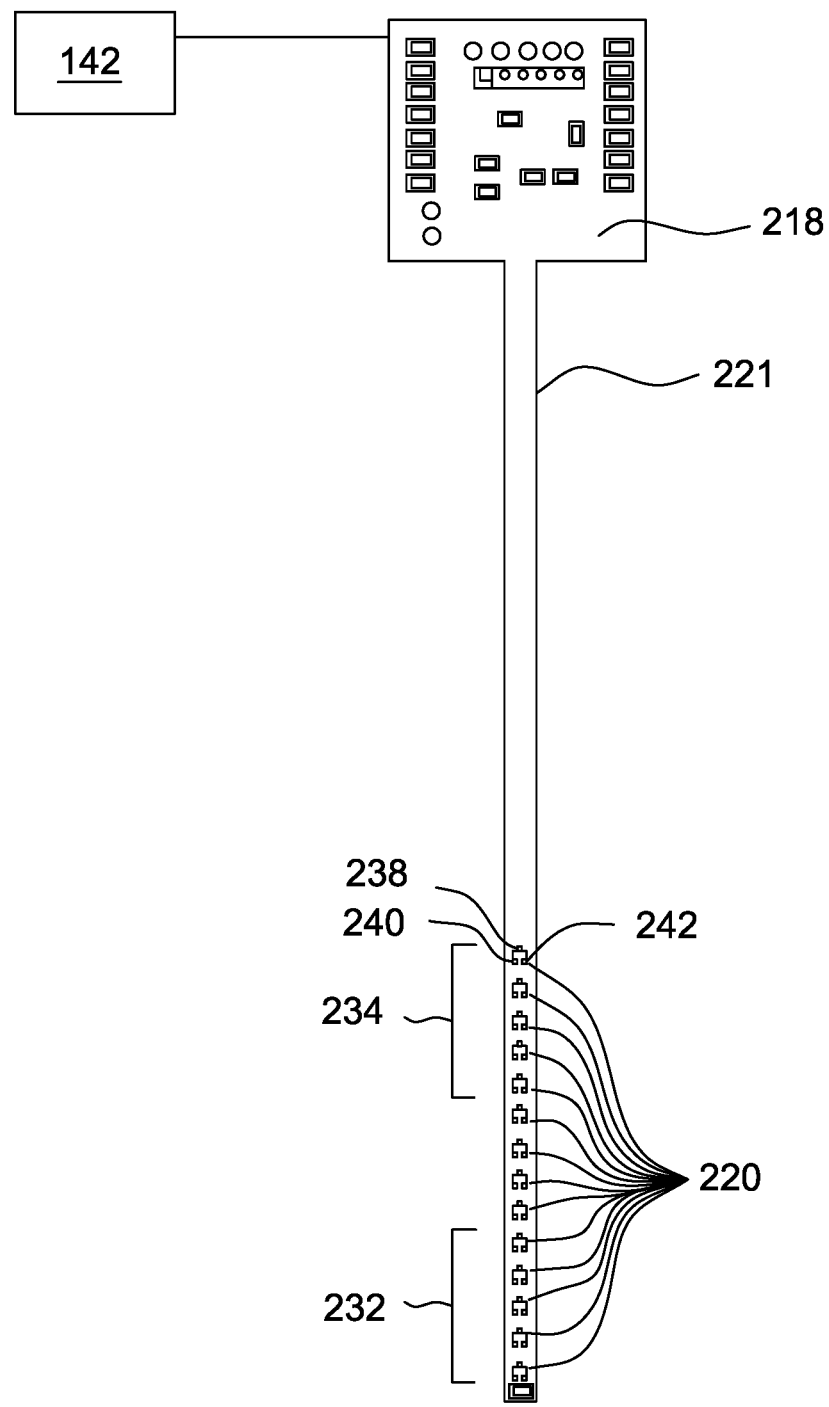
FIG. 9 is a schematic view of the printed circuit board assembly shown in FIG. 7.

In reference to FIGS. 7-9, in the example embodiment, the sensors 220 are longitudinally spaced apart along the sensor assembly 206 (specifically, along the PCB narrow profile section 221) by a distance 230. The distance 230 may be selected based on the number of sensors 220, the area available on the PCB assembly 218, the strength of the magnetic field generated by the traveler 204, and any other suitable factors. In suitable embodiments, the sensors 220 may be spaced apart by any distance 230 that enables the sensor assembly 206 to function as described. For example, in suitable embodiments, the distance 230 is in a range of about 1 millimeter to about 10 millimeters, and more suitably in a range of about 2 millimeters and about 6 millimeters. In some embodiments, the distance is about 2 millimeters, about 2.5 millimeters, about 3 millimeters, about 3.5 millimeters, or about 4 millimeters. In other embodiments, the distance is about 1/16 of an inch, about 1/8 of an inch, about 3/16 of an inch, about 1/4 of an inch or about 1/2 of an inch. In some embodiments, the sensors 220 may be staggered such that adjacent sensors overlap one another. The distance 230 between the sensors 220 may allow for a greater resolution in detecting the position of the traveler 204. In other embodiments, the sensors 220 may be positioned on opposite sides of the PCB assembly 218 such that the spacing between adjacent sensors may be less than if the sensors were positioned on the same side. In the illustrated embodiment, the sensor assembly 206 includes fourteen sensors 220 equally spaced apart.

In the example embodiment, the sensors 220 are Hall effect switches. More specifically, referring to FIG. 9, each sensor 220 includes a digital output pin 238, power pins 240 and 242, and at least one magnetic switching element (not shown in FIG. 9). When the magnetic switching element is placed within a magnetic field of sufficient strength, the magnetic switching element closes a circuit between the power pins 240 and 242 and the digital output pin 238, or otherwise outputs an electrical signal via the digital output pin 238. In alternative embodiments, the sensor assembly 206 includes any sensors 220 that enable the sensor assembly 206 to operate as described herein. In yet other embodiments, the sensor assembly 206 may include sensing devices whose electrical characteristics (e.g., resistance) vary based on the presence of a magnetic field. In some embodiments, for example, the sensor assembly 206 includes magneto-resistive sensing devices that have magnetically-variable resistances. In In another suitable embodiment, the sensors 220 are analog Hall effect sensors, each providing a voltage signal that varies based on the position of the traveler 204 relative to the corresponding sensor 220. In such an embodiment, each sensor 220 may produce a measurable electrical characteristic (e.g., output voltage, current, resistance) that varies based on the strength and/or polarity of the magnetic field generated by the traveler 204 and, therefore, the position of the traveler. For example, each sensor 220 may output a nominal output voltage (e.g., 2.5 V) in the absence of a magnetic field, and output a variable voltage in the presence of a magnetic field. Accordingly, the position of the traveler 204 may be determined by identifying the sensor(s) 220 affected by the traveler 204. Each sensor 220 may be considered to be "affected by" or "activated by" the traveler 204 when an absolute or differential value of a measured electrical characteristic of the sensor (e.g., output voltage, current, electrical resistance) exceeds a threshold value. For example, a sensor 220 may be considered to be affected by the traveler 204 when its nominal output voltage varies by more than a threshold value, such as 1 V. In some embodiments, the threshold value may be different for a positive change and a negative change in the measured electrical characteristic. In addition, a change in the measured electrical characteristic may be related to the distance between the traveler 204 and the sensor 220. Accordingly, the position of the traveler 204 may be determined based on a magnitude of change in the measured electrical characteristic of an affected sensor 220. For example, a change in the measured output voltage of an affected sensor of +/−1.5 V may indicate that the traveler is 2 mm away from the affected sensor 220. In some embodiments, the detected change in the measured electrical characteristic of the sensor 220 may be about 1 millivolt (mV) or greater. Additionally, the direction of change in the measured electrical characteristic (positive or negative) may be used to determine the position of the traveler 204. For example, the measured electrical characteristic of the affected sensor 220 may decrease when a first pole (e.g., north pole) of the traveler 204 is adjacent the sensor 220 (i.e., closer to the sensor 220 than the second pole), and increase when an opposite, second pole (e.g., south pole) is adjacent the sensor (i.e., closer to the sensor 220 than the first pole).

In reference to FIGS. 5 and 9, in operation, the magnetic field of the traveler 204 may activate or affect varying groups or subsets of the plurality of sensors 220 as the traveler 204 moves along the sensor assembly 206. For example, when the traveler 204 is positioned adjacent a first portion of the sensor assembly 206, a first group or subset 232 of the plurality of sensors 220 may be activated or affected. When the traveler 204 is positioned adjacent a second portion of the sensor assembly 206, a second group or subset 234 of the plurality of sensors 220 may be activated or affected. In some embodiments, the traveler 204 may affect a different number of the sensors 220 depending on the position of the traveler along the sensor assembly 206. In some embodiments, for example, the traveler may activate or affect a single sensor 220 when the traveler 204 is positioned generally proximate the sensor 220, and activate or affect two sensors when the traveler 204 is positioned at an intermediate position between the two sensors 220. This type of sensing configuration may also be referred to as "1-2-1" switching, and may provide a greater number of indication points for a given sensor assembly as compared to some sensor assemblies in which only one sensor is activated or affected at a time regardless of the traveler position. In further embodiments, the sensors 220 are spaced apart such that the sensors are individually affected by the traveler 204.

In some embodiments, the traveler 204 may activate or affect more than two sensors simultaneously, such as up to five sensors simultaneously. Moreover, in some embodiments, more than five sensors may be activated or affected at a time. In other embodiments, four or fewer sensors 220 may be activated or affected at a time.

The number of sensors 220 that are activated or affected by the magnetic field is related to the spacing of the sensors 220 and the strength of the magnetic field. For example, a greater number of the sensors 220 may be activated or affected when the sensors 220 are spaced relatively close. Accordingly, reducing the distance 230 between the sensors 220 may increase the resolution of the sensor assembly 206 to the magnetic field. In yet other embodiments, the resolution of the sensor assembly 206 is increased by using sensors 220 having electrically-variable characteristics. In such embodiments, the sensors 220 may be spaced a greater distance apart and the sensor assembly 206 may include a reduced number of sensors because each sensor may be used to determine multiple positions of the traveler (e.g., based on a magnitude and/or direction of change in a measured electrical characteristic, as described above).

Further, in some embodiments, the sensor assembly 206 may also include "dead spots" in which none of the sensors 220 are activated or affected by the traveler 204. In some embodiments, for example, two adjacent sensors of the plurality of sensors 220 may be positioned a sufficient distance from one another such that, when the traveler 204 is positioned intermediate the two adjacent sensors, neither of the sensors are activated or affected. In such embodiments, the position or height of the traveler 204 may be determined by tracking the outputs of the sensors over time. For example, when one of the two adjacent sensors changes from an activated or affected state to an inactive or unaffected state, and the other of the two adjacent sensors remains in an inactive or unaffected state, the controller 142 may determine that the traveler 204 is positioned between the two adjacent sensors. Additionally or alternatively, the controller 142 may be configured to determine that the traveler was positioned between the two adjacent sensors subsequent to (i.e., later in time) the traveler being positioned between the two adjacent sensors. In further embodiments, the sensors 220 may be spaced such that the traveler 204 affects at least one sensor when the traveler is in any position along the sensor assembly.

In some embodiments, the fluid flow through the flow monitoring apparatus 200 and the path of the traveler 204 may be estimated using predictive models and/or anticipated flow changes. In such embodiments, the controller 142 may be configured to compare the estimations to the changes in the state of the sensors 220, and/or the determined position of the traveler 204 (e.g., when the traveler is not affecting a sensor). Based on the comparisons, the controller 142 may determine if the flow monitoring apparatus 200 is operating as predicted.

In some embodiments, the direction of change of a measured electrical characteristic of the sensors 220 may be used to determine the direction of movement of the traveler 204. In such embodiments, the direction of movement of the traveler 204 may be used to determine the position of the traveler between two sensors. For example, the signal from a first sensor 220 may be used to determine that the traveler 204 is moving toward a second, adjacent sensor 220. Accordingly, it may be determined that the traveler 204 is positioned between the first and second sensors 220 when the first sensor switches to an inactive or unaffected state and the second sensor remains in an inactive or unaffected state. Accordingly, in some embodiments, the position of the traveler 204 between adjacent sensors 220 may be determined without the use of predictive models.

With reference to FIGS. 8 and 9, the sensor assembly 206 further includes a processor or microcontroller 236 communicatively connected to each of the sensors 220. In some embodiments, the processor 236 may be configured to detect the state of each sensor 220. In some embodiments, such as embodiments in which the sensors are magnetically-activated switches, the processor 236 detects the state of each sensor 220 by detecting if the sensor 220 is on (i.e., activated or affected) or off (i.e., deactivated or unaffected). In other embodiments, such as embodiments in which the sensors are analog Hall effect sensors, the processor detects the state of each sensor 220 by detecting or measuring an electrical characteristic of each sensor, such as an output voltage or current. For example, the processor 236 may receive a nominal output voltage (e.g., 2.5 V) from each sensor 220 in the absence of a magnetic field, and receive a variable voltage when the respective sensor is in the presence of a magnetic field. The processor 236 may determine a sensor 220 is affected when the output voltage received from the sensor varies by more than a threshold value, such as 1 V. The processor 236 may also include an analog-to-digital converter for each of the sensors 220 for converting an analog output signal of each sensor 220 into a digital signal. In some embodiments, at least one of the sensors 220 may include an analog sensor that communicates using a digital communication interface (e.g., a controller area network (CAN), an inter-integrated circuit (I2C), a serial peripheral interface (SPI), a universal asynchronous receive/transmitter (UART), a 1-Wire bus system, a Microwire interface, and software based serial communications such as "bit banging"). In such embodiments, the analog-to-digital conversion is performed prior to sending the signal to the processor 236.

In the example embodiment, the processor 236 includes a unique input for each of the sensors 220. In the example embodiment, each of the inputs of the processor is connected to the digital output pin 238 of one of the sensors 220. In operation, sensors 220 that are activated or affected by the traveler 204 output a signal to the processor 236, and the processor receives each of the signals at a corresponding input of the processor 236.

Based on the signals received, and the inputs of the processor at which the signals are received, the processor 236 can determine which of the plurality of sensors 220 are affected. In some embodiments, the processor 236 may be further configured to determine the position or height of the traveler 204 along the sensor assembly 206 based on the group or subset of the plurality of sensors 220 that are affected and/or the time-dependent activation of the sensors 220 (e.g., where the sensor assembly 206 includes dead spots). Moreover, in some embodiments, the processor 236 may determine the position or height of the traveler 204 based on the magnitude and/or the sign (positive or negative) of the output signal (e.g., voltage) of each of the sensors 220. For example, the processor 236 may determine a magnitude of change in a nominal output voltage of each sensor 220, and determine the position of the traveler 204 based on the change. In other embodiments, the processor 236 may output a signal to the controller 142 indicative of the number, state, and/or location of the plurality of sensors 220 that are affected by the traveler 204, and the controller 142 determines the position or height of the traveler 204 along the sensor assembly 206. The sensor assembly 206 may include any suitable processor or microcontroller 236 that enables the flow monitoring apparatus 200 to operate as described herein. In yet other embodiments, the sensor assembly 206 does not include a processor or microcontroller, and instead includes a resistor network to output a voltage that varies based on the number and location of affected sensors. The variable output voltage may be used, for example, to drive a simple gauge or other output that indicates traveler height, volumetric flow rate, or other suitable parameter.

In reference to FIG. 9, the sensor assembly 206 is connected to the controller 142 such that the sensor assembly 206 can send a signal to the controller 142. The signal can include information relating to the determined states of the sensors 220 and/or the position of the traveler 204. In some embodiments, the sensor assembly 206 further includes a wireless device to enable the sensor assembly 206 to communicate wirelessly with the controller 142 and/or other remote devices (not shown). In some embodiments, the sensor assembly 206 includes a battery (not shown) to power the wireless device. In some embodiments, the sensor assembly 206 may communicate with the controller 142 and other components through a controller area network (CAN).

The controller 142 may perform functions based on the information received from the sensor assembly 206. For example, the controller 142 may execute an algorithm to determine the volumetric flow rate through the interior cavity 214 based on the position or height of the traveler 204 within the interior cavity 214, the drag force of the fluid, the fluid flow velocity through the interior cavity 214, the gravitational force on the traveler 204, and/or the cross-sectional area of the housing 202. In addition, the controller 142 may account for other factors such as the fluid passing through the opening 228 in the traveler 204. The controller 142 may generate a value for the volumetric flow rate in units of gallons per minute (gpm), or any other suitable units for measuring volumetric flow rate. In other embodiments, the controller 142 may receive a flow rate from the processor 236. In yet other embodiments, the controller 142 may compare the heights of travelers (or corresponding output signals from sensor assemblies 206) from a plurality of flow monitoring apparatus 200 to detect fluid flow anomalies or irregularities in the system 100. In such embodiments, the controller 142 may output an alert or alarm to a user of the system 100 in response to detecting a fluid flow anomaly or irregularity.

Figure 10:
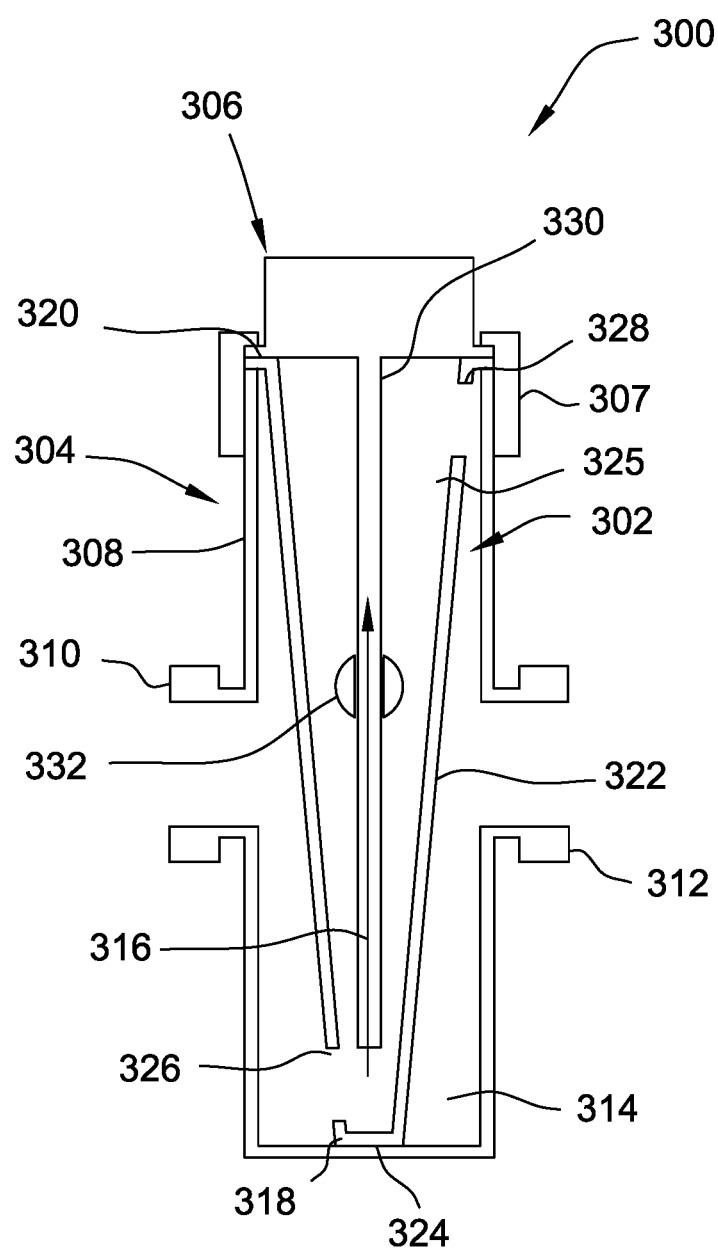
FIG. 10 is a schematic sectional view of a flow monitoring apparatus including a removable inner housing.

FIG. 10 is a schematic sectional view of another embodiment of a flow monitoring apparatus 300 that includes a removable funnel or inner housing 302. The flow monitoring apparatus 300 includes the inner housing 302, an outer housing 304, a traveler assembly 306, and a cap 307. The outer housing 304 includes an outer sidewall 308, an inlet 310, and an outlet 312. The outer sidewall 308 defines a cavity 314. The inner housing 302 is removably positioned within the cavity 314 and is releasably connected to the outer housing 304.

The outer housing 304 is configured to be connected in fluid communication with the fluid line 120 (shown in FIG. 2) and the supply line 124 (shown in FIG. 2) to allow fluid to flow through the cavity 314. In particular, the inlet 310 may be connected to the fluid line 120 (shown in FIG. 2), either directly or through one or more intermediate fluid conduits, and the outlet 312 may be connected to one of the supply lines 124 (shown in FIG. 2) such that fluid enters the cavity 314 through the inlet 310 and exits the cavity 314 through the outlet 312. In the illustrated embodiment, the outer housing 304 has a cylindrical shape. In other embodiments, the flow monitoring apparatus 300 may include any outer housing 304 that enables the flow monitoring apparatus 300 to operate as described herein.

The inner housing 302 includes a first end 318, a second end 320, an inner sidewall 322, and an end wall 324. The inner sidewall 322 extends from the first end 318 to the second end 320. The inner sidewall defines an interior cavity 325, an inlet 326 for fluid to flow into the interior cavity 325, and an outlet 328 for fluid to flow out of the interior cavity 325. The inner housing 302 is positioned within the cavity 314 such that the fluid flowing into the cavity 314 through the inlet 310 is directed towards the inlet 326. The fluid is discharged from the interior cavity 325 through the outlet 328 and is directed towards the outlet 312. Accordingly, the fluid flows through the inner housing 302 in a flow direction, indicated by arrow 316, from the inlet 326 to the outlet 328. In addition, the second end 320 of the inner housing 302 seals the end of the interior cavity 325 and prevents fluid leakage. In the illustrated embodiment, the inner housing 302 is oriented substantially vertically and the inlet 326 is below the outlet 328 such that the fluid flows upwards. In alternative embodiments, the inner housing 302 may be positioned in any manner that enables the flow monitoring apparatus 300 to operate as described herein.

In the illustrated embodiment, the inner housing 302 has a conical or funnel shape. Accordingly, the interior cavity 325 has a varying cross-sectional area. In particular, the cross-sectional area of the interior cavity 325 increases from the first end 318 to the second end 320. In other embodiments, the inner housing 302 may have any suitable shape that enables the flow monitoring apparatus 300 to operate as described herein.

The inner housing 302 and the outer housing 304 may be constructed from a variety of suitable materials, including, for example and without limitation, plastics, such as polycarbonate, polypropylene, polyethylene; ceramics, such as glass; and metals, such as brass, aluminum, and stainless steel. In some embodiments, at least one of the inner housing 302 and the outer housing 304 is constructed from transparent or translucent materials.

A traveler 332 is positioned within the interior cavity 325 and is free to move as the fluid flows through the interior cavity 325. For example, the traveler 332 may move longitudinally along a sensor assembly 330 within the interior cavity 325 as fluid flows through the interior cavity 325.

The cross-sectional profile of the inner housing 302 affects the range of flow rates that can be measured by the flow monitoring apparatus 300. For example, if the inner housing 302 is used at flow rates above the range of measurable flow rates, the traveler 332 will rise to its maximum height within the interior cavity 325, and will not move in response to fluctuations in flow rate. Similarly, if the inner housing 302 is used at flow rates below the range of measurable flow rates, the traveler 332 will remain at the bottom of the interior cavity 325, and will not move in response to fluctuations in flow rate.

In the illustrated embodiment, the inner housing 302 and the outer housing 304 are formed as separate parts. Moreover, the inner housing 302 releasably connects to the outer housing 304 such that the inner housing 302 can be removed from the outer housing 304 and interchanged with another inner housing having a different range of measurable flow rates (e.g., a different cross-sectional profile). In some embodiments, the inner housing 302 can be removed from the outer housing 304 and interchanged with another inner housing while the flow monitoring apparatus is connected to the fluid line 120 (shown in FIG. 2) and the supply line 124 (shown in FIG. 2). As a result, the inner housing 302 may be removed and, if necessary, replaced without disconnecting the flow monitoring apparatus 300 from the fluid application system 100 (shown in FIG. 1).

In the illustrated embodiment, the inner sidewall 322 of the inner housing 302 is spaced from the outer sidewall 308 of the outer housing 304 when the inner housing 302 is positioned within the cavity 314. Moreover, the inner sidewall 322 is angled in relation to the outer sidewall 308. In particular, the inner sidewall 322 angles toward the outer sidewall 308 from the first end 318 to the second end 320 such that the distance between the inner sidewall 322 and the outer sidewall 308 is less at the second end 320 than at the first end 318. In other embodiments, the inner sidewall 322 may extend in any direction relative to the outer sidewall 308. For example, in some embodiments, the inner sidewall 322 and the outer sidewall 308 may include portions that are parallel, perpendicular, curved, and/or angled in relation to each other.

In addition, the flow monitoring apparatus 300 may include any traveler assembly 306 that enables the flow monitoring apparatus 300 to operate as described herein. In the illustrated embodiment, for example, the traveler assembly 306 has substantially the same construction and operates in substantially the same manner as the sensor assembly 206 and traveler 204 described above with reference to FIGS. 4-9. For example, the traveler assembly 306 includes a sensor assembly 330 and a traveler 332. The sensor assembly 330 is configured to detect a position of the traveler 332 to facilitate determining characteristics of fluid flow through the flow monitoring apparatus 300. In other embodiments, at least a portion of the traveler assembly 306 may be positioned on an exterior of the flow monitoring apparatus 300.

To assemble the flow monitoring apparatus 300, the inner housing 302 is positioned within the cavity 314 and releasably secured to the outer housing 304. The inner housing 302 and the outer housing 304 each have open ends and both are oriented such that the open ends are positioned at a top of the flow monitoring apparatus 300. The traveler assembly 306 is positioned within the interior cavity 325 such that the traveler assembly 306 substantially closes the open ends of the inner housing 302 and the outer housing 304. The cap 307 is positioned over the traveler assembly 306 and secured to the outer housing 304. Accordingly, the cap 307 releasably connects the inner housing 302, the outer housing 304, and the traveler assembly 306. In other embodiments, the flow monitoring apparatus 300 may be assembled in any manner that enables the flow monitoring apparatus 300 to operate as described herein. For example, in some embodiments, any of the inner housing 302, the outer housing 304, the traveler assembly 306, and the cap 307 may be formed as a single component. In suitable embodiments, the cap 307 may be secured to the outer housing 304 in any manner that enables the traveler assembly 306 to operate as described herein. For example, in some embodiments, the cap 307 may be screwed onto threads on the outer housing 304.

In suitable embodiments, the inner housing 302 may include a visual indicator of certain characteristics of the inner housing 302, such as an operable or measurable flow range (i.e., a range of flow rates that can be measured or discerned with the flow monitoring apparatus 300). In addition, the visual indicator may correspond to a configuration and/or component of the fluid application system 100 (shown in FIG. 1), such as a nozzle tip, with which the inner housing 302 is intended for use. As a result, the visual indicator may facilitate an operator recognizing that the inner housing 302 corresponds to a selected component or a measurable flow range.

In some embodiments, the visual indicator may include at least one of a symbol, a color, an alphanumeric character, and a shape. In one embodiment, for example, the inner housing 302 is at least partially colored. In alternative embodiments, the inner housing 302 may include any visual indicator that enables the inner housing 302 to function as described herein.

In some embodiments, the visual indicator may conform to standard indicators developed by industry standard setting organizations. For example, the American Society of Agricultural and Biological Engineers has developed a standardized color-coding scheme for nozzles. Specifically, the color-coding scheme assigns different colors to different nozzles based on the flow rate through the nozzle at a standardized fluid pressure of 40 pounds per square inch. Table 1 below lists the standardized nozzle colors developed by the American Society of Agricultural and Biological Engineers.

TABLE 1

Colors for Nozzle Tips and Corresponding Flowrates

| Nozzle Color | Flow Rate (Gallons per Minute) at a pressure of 40 pounds per square inch |
|---|---|
| Orange | 0.10 |
| Green | 0.15 |
| Yellow | 0.20 |
| Purple | 0.25 |
| Blue | 0.30 |
| Red | 0.40 |
| Brown | 0.50 |
| Grey | 0.60 |
| White | 0.80 |

Accordingly, the visual indicator may assist an operator selecting an inner housing that is appropriate with a specific configuration or flow rate of the fluid application system.

The inner housing 302 enables the flow monitoring apparatus 300 to more accurately detect flow characteristics such as flow rates that are associated with a selected configuration of the fluid application system 100 (shown in FIG. 1). Moreover, an operator may select a particular inner housing 302 that is associated with a configuration of the fluid application system 100 (shown in FIG. 1). The visual indicator on the inner housing 302 may help the operator quickly and easily identify the proper inner housing 302. For example, the inner housing 302 may include a color associated with a nozzle tip. An operator could easily identify that the inner housing 302 was appropriate to use by comparing the color of the inner housing 302 to the color of the nozzle tip installed on the fluid application system 100 (shown in FIG. 1). Because the inner housing 302 is removable from the flow monitoring apparatus 300, the operator may remove a previously installed inner housing 302 and install the selected inner housing 302.

In some embodiments, the operator may select which inner housing 302 to install based at least in part on the traveler assembly 306. For example, an inner housing 302 may be selected that allows the flow monitoring apparatus 300 to detect movement of the traveler 332 within the interior cavity 325 for a specified range of flow rates. As a result, the inner housing 302 may be changed and the same traveler assembly 306 may be used to detect different ranges of flow characteristics without changing components of the traveler assembly 306, such as the traveler. However, in some embodiments, the traveler assembly 306 and/or components of the traveler assembly 306 may be replaced or adjusted to measure different flow characteristics. In such embodiments, components of the traveler assembly 306 may include visual indicators to facilitate the operator selecting the appropriate component. For example, in some embodiments, the traveler 332 may include a visual indicator that corresponds to characteristics of the traveler 332 such as weight, density, and/or material.

In some embodiments, the inner housing 302 may be included in a kit with a plurality of different inner housings 302. For example, each inner housing 302 in the kit may correspond to a different nozzle tip and/or a different range of measurable flow rates. Moreover, each inner housing 302 may include a different visual indicator that allows the operator to identify which component the different inner housings 302 are associated with. In operation, the operator may select an inner housing 302 from the kit that is appropriate for use with a particular configuration and/or range of flow rates of the fluid application system 100 (shown in FIG. 1). The operator may remove any existing inner housing 302 from the cavity 314 and replace the previously installed inner housing 302 with the selected inner housing 302. While the inner housing 302 is installed, the flow monitoring apparatus 300 may remain in position on the fluid application system 100 (shown in FIG. 1) and connected to fluid lines. In suitable embodiments, the kit may include any number of inner housings 302. In some embodiments, the kit may include more than one inner housing 302 of the same type to allow the inner housing 302 to be replaced if the inner housing 302 is worn or damaged.

Figure 11:
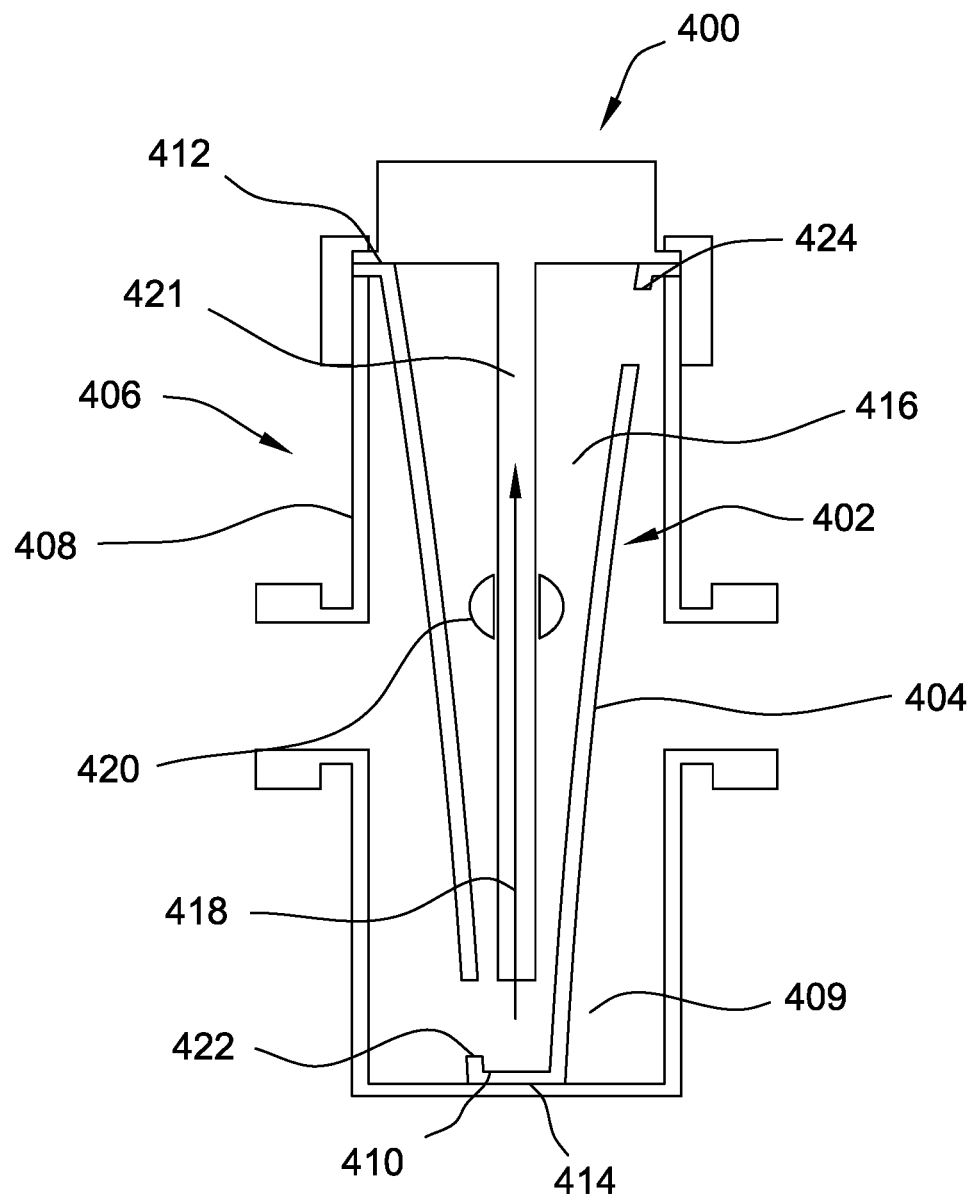
FIG. 11 is a schematic sectional view a flow monitoring apparatus including an inner housing having a non-uniform taper.

FIG. 11 is a schematic sectional view of another embodiment of a flow monitoring apparatus 400 that includes an inner housing 402 having an inner sidewall 404 with a non-uniform taper. The flow monitoring apparatus further includes an outer housing 406 having an outer sidewall 408 defining a cavity 409. The inner housing 402 includes the inner sidewall 404, a first end 410, a second end 412, and an end wall 414. The inner sidewall 404 extends between the first end 410 and the second end 412 and defines an interior cavity 416. The inner housing 402 is positioned within the cavity 409 and releasably connected to the outer housing 406. In some embodiments, the outer housing 406 may be omitted. In such embodiments, an inlet 422 and an outlet 424 of the inner housing 402 may be connected to fluid lines of the fluid application system 100 (shown in FIG. 1).

In the illustrated embodiment, the inner housing 402 has a horn shape and tapers non-uniformly from a smaller diameter at the first end 410 to a larger diameter at the second end 412. Accordingly, the interior cavity 416 has a varying cross-sectional area. In particular, the cross-sectional area of the interior cavity 416 increases from the first end 410 to the second end 412. Moreover, the taper of the inner sidewall 404 changes between the first end 410 and the second end 412. Specifically, the sidewall 404 curves outward from the first end 410 to the second end 412, and thus the angle at which the sidewall 404 is tapered gradually and continuously increases from the first end 410 to the second end 412. As a result, the cross-sectional area of the inner housing 402 changes at a varying (i.e., non-uniform) rate between the first end 410 and the second end 412. In other embodiments, the inner sidewall 404 may have any suitable shape that enables the flow monitoring apparatus 400 to operate as described herein. For example, in some embodiments, the inner sidewall 404 may include at least one section where the cross-sectional area is constant over a certain axial length of the inner housing 402. In such embodiments, the inner housing 402 may have a cylindrical shape along the portion(s) of the inner housing 402 where the cross-sectional area remains constant.

In the illustrated embodiment, the inner housing 402 is positioned within the cavity 409 such that the inner sidewall 404 is spaced from the outer sidewall 408 along at least a portion of the inner sidewall 404. Moreover, the inner sidewall 404 curves toward the outer sidewall 408 from the first end 410 to the second end 412. Accordingly, the distance between the inner sidewall 404 and the outer sidewall 408 is less at the second end 412 than at the first end 410. In other embodiments, the inner sidewall 404 may extend in any direction relative to the outer sidewall 408. For example, in some embodiments, the inner sidewall 404 and the outer sidewall 408 may include portions that are parallel, perpendicular, curved, and/or angled in relation to each other.

In operation, fluid flows through the inner housing 402 in a flow direction, indicated by arrow 418, from the inlet 422 towards the outlet 424. A traveler 420 is positioned within the interior cavity 416 and is free to move as the fluid flows through the interior cavity 416. For example, the traveler 420 may move longitudinally within the interior cavity 416 as fluid flows through the interior cavity 416. Generally, the traveler 420 is moved within the interior cavity 416 by a drag force created by fluid flowing around the traveler 420. The drag force is proportional to the velocity of the fluid, which is proportional to the volumetric flow rate of the fluid and inversely proportional to the cross-sectional area of the inner housing 402. Thus, for a given volumetric flow rate, the velocity of the fluid gradually decreases from the inlet 422 to the outlet 424 because the cross-sectional area of the interior cavity 416 gradually increases in the flow direction 418. In addition, the acceleration of the fluid varies, i.e., the velocity of the fluid flow changes at a non-constant rate, because the cross-sectional area of the interior cavity 416 varies at a changing rate. As a result, the drag force decreases from the inlet 422 to the outlet 424 as the velocity of the fluid decreases. The traveler 420 will be moved by the fluid and settle at a position where the drag force from the fluid and the opposing forces acting on the traveler 420 (e.g., gravity, biasing elements, etc.) are at equilibrium.

When the volumetric flow rate through the interior cavity 416 increases, the average fluid flow velocity within the interior cavity 416 will increase, exerting a greater drag force on the traveler 420. The increased drag force will cause the traveler 420 to rise until the traveler 420 reaches a position at which the drag force is in equilibrium with the gravitational force on the traveler 420. Similarly, when the volumetric flow rate through the interior cavity 416 decreases, the average fluid flow velocity within the interior cavity 416 will decrease, exerting a lower drag force on the traveler 420. The reduced drag force will cause the traveler 420 to drop until the traveler 420 reaches a position at which the drag force is again in equilibrium with the gravitational force on the traveler 420.

In suitable embodiments, a sensor assembly 421 may detect the position of the traveler 420. The position of the traveler 420 may be used to determine values relating to fluid flow. For example, the volumetric flow rate through the interior cavity 416 of the inner housing 402 can be determined based on the height of the traveler 420. The volumetric flow rate may be calculated in any manner that enables the fluid application system 100 to operate as described herein.

The flow monitoring apparatus 400 may have an increased sensitivity to specific ranges of flow rates because the cross-sectional area of the interior cavity 416 changes at a non-constant rate from the inlet 422 to the outlet 424. For example, the same change in flow rate may cause the traveler 420 to be displaced a greater longitudinal distance through a portion of the interior cavity 416 having a more gradual change in cross-sectional area than through a portion of the interior cavity 416 having a less gradual (i.e., more severe) change in cross-sectional area. As a result, the flow monitoring apparatus 400 may be able to detect more subtle changes in flow rates within specific ranges. Moreover, the flow monitoring apparatus 400 may detect flow rates with increased accuracy and precision.

In some embodiments, the inner housing 402 may include one or more sections where the cross-sectional area remains substantially constant. As a result, the traveler 420 may move immediately through and not settle within, i.e., may skip, the constant-area section. Such skips may facilitate the flow monitoring apparatus detecting when the fluid passes a critical flow rate. In addition, in some embodiments, the inner housing 402 may include stepped portions where the interior cavity 416 alternates between sections having a pronounced change in cross-sectional area and sections having a less pronounced change in cross-sectional area.

While, in some embodiments, the described methods and systems are used to handle a fluid that is applied to agricultural fields, such as a liquid fertilizer, the described methods and systems may be used for handling any type of fluids, not just fluids for use in the agricultural industry.

Embodiments of the flow monitoring apparatus described herein may be used to detect and/or diagnose several conditions of fluid distribution systems, including, for example and without limitation, individual plugged rows from foreign debris, a group of plugged rows from a plugged or obstructed strainer, the presence of air in a fluid distribution line resulting from operation on a hillside (i.e., where air goes up and liquid goes down), air or density issues from bad product, an empty tank, a failed or inoperative fluid pump, and metering device failures.

Embodiments of the methods and systems described herein provide improved performance of fluid application systems as compared to prior methods and systems. For example, the systems and methods described herein provide improved flow monitoring apparatus that have an increased sensitivity to differences in fluid flow rates, and can detect a wider range of flow rates than prior art systems. Additionally, embodiments of the systems described herein may be responsive to detected fluid flow anomalies or irregularities by controlling valves or other actuators based on fluid flow information received from flow monitoring apparatus. Moreover, embodiments of the electric fluid flow monitoring apparatus described herein enable the flow monitoring apparatus to be located outside a visual line-of-sight of an operator, and thereby provide improved flexibility in installing the flow monitoring apparatus. In addition, embodiments of the flow monitoring apparatus decrease the cost and time required to assemble fluid application systems.

In addition, the systems and methods described herein provide flow monitoring apparatus that may be adjusted to accommodate different configurations of the fluid application system. For example, an inner housing of the flow monitoring apparatus may be removed and interchanged with another inner housing that accommodates different flow rates and/or flow tips. Moreover, the inner housing may be interchanged with another inner housing without adjusting or replacing a sensor assembly. Also, the flow monitoring apparatus may facilitate an operator easily identifying the appropriate inner housing for a specific flow rate and/or flow tip. Some embodiments of the flow monitoring apparatus have a non-uniform taper that provides an increased sensitivity to specific ranges of flow rates and allows an operator to monitor specific flow rates and/or ranges of flow rates.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

When introducing elements of the present invention or the preferred embodiment(s) thereof, the articles "a", "an", "the" and "the" are intended to mean that there are one or more of the elements. The terms "comprising", "including" and "having" are intended to be inclusive and mean that there may be additional elements other than the listed elements. Moreover, the use of "top", "bottom", "above", "below" and variations of these terms is made for convenience, and does not require any particular orientation of the components.

As various changes could be made in the above without departing from the scope of the invention, it is intended that all matter contained in the above description and shown in the accompanying drawings shall be interpreted as illustrative and not in a limiting sense.

What is claimed is:

1. A system for applying fluid to an agricultural field, the system comprising:
    a supply tank;
    a fluid line connected to the supply tank;
    a fluid dispenser connected in fluid communication with the fluid line for dispensing fluid at least one of onto and into the agricultural field; and
    a flow monitoring apparatus connected in fluid communication with the fluid line, the flow monitoring apparatus comprising:
        a housing defining an interior cavity, the housing including an inlet for fluid to enter the interior cavity and an outlet for fluid to exit the interior cavity, wherein the fluid line is connected to the flow monitoring apparatus such that fluid flows through the interior cavity from the inlet to the outlet;
        a sensor assembly disposed in the interior cavity, the sensor assembly extending longitudinally in the direction of fluid flow, the sensor assembly including a casing having a longitudinal axis, an adapter body connected to the casing, and a printed circuit board assembly including a narrow profile section positioned within an interior of the casing and a wide profile section extending beyond the adapter body, the printed circuit board assembly further including a plurality of magnetic sensors spaced longitudinally along the narrow profile section of the printed circuit board assembly, the adapter body configured to releasably connect to one of the inlet and the outlet of the housing such that the casing extends into the interior cavity and the longitudinal axis is substantially parallel to the direction of fluid flow; and
        a traveler disposed in the interior cavity and movable in relation to the housing, the traveler including at least one magnet that generates a magnetic field, wherein the traveler is movably supported by the sensor assembly such that fluid flow through the interior cavity causes the traveler to move longitudinally along the sensor assembly, wherein the sensor assembly detects a longitudinal position of the traveler relative to the sensor assembly.

2. The system of claim 1, wherein each of the plurality of magnetic sensors has an electrical characteristic that varies based on a presence of the magnet.

3. The system of claim 2 further comprising a controller including at least one processor communicatively connected to the sensor assembly, wherein the at least one processor is configured to:
    receive a signal from each of the plurality of magnetic sensors, wherein the signal relates to the electrical characteristic; and
    determine a position of the traveler within the housing based on the received signal.

4. The system of claim 1, wherein the at least one magnet is positionable along the sensor assembly at an intermediate position between at least two of the plurality of magnetic sensors, and wherein the magnet is configured to simultaneously activate the at least two of the plurality of magnetic sensors when in the intermediate position.

5. The system of claim 1 further comprising a controller including at least one processor communicatively connected to the sensor assembly, wherein the at least one processor is configured to:
    identify a subset of the plurality of magnetic sensors that are affected by the at least one magnet; and
    determine a position of the traveler within the housing based on the identified subset of magnetic sensors.

6. The system of claim 5, wherein each of the plurality of magnetic sensors includes an output communicatively connected to a unique input of the at least one processor.

7. The system of claim 5, wherein the subset of the plurality of magnetic sensors includes a single sensor of the plurality of magnetic sensors.

8. The system of claim 1, wherein the casing is cylindrical and extends through an opening in the traveler.

9. The system of claim 8, wherein the casing extends within the interior cavity between the inlet and the outlet.

10. The system of claim 1, further comprising a pump for directing fluid from the supply tank through the fluid line.

11. A flow monitoring apparatus for detecting fluid flow through a system, the flow monitoring apparatus comprising:
    a housing defining an interior cavity, the housing including an inlet for fluid to enter the interior cavity and an outlet for fluid to exit the interior cavity, wherein fluid flows through the interior cavity from the inlet to the outlet;
    a traveler disposed in the interior cavity and movable in relation to the housing, the traveler including at least one magnet that generates a magnetic field; and
    a sensor assembly disposed in the interior cavity between the inlet and the outlet, the sensor assembly extending longitudinally in the direction of fluid flow, the sensor assembly including a casing having a longitudinal axis, an adapter body connected to the casing, and a printed circuit board assembly including a narrow profile section positioned within an interior of the casing and a wide profile section extending beyond the adapter body, the printed circuit board assembly further including a plurality of magnetic sensors spaced longitudinally along the narrow profile section of the printed circuit board assembly, the adapter body configured to releasably connect to one of the inlet and the outlet of the housing such that the casing extends into the interior cavity and the longitudinal axis is substantially parallel to the direction of fluid flow, the traveler being movably supported by the sensor assembly such that fluid flow through the interior cavity causes the traveler to move longitudinally along the sensor assembly, wherein the sensor assembly is configured to output a traveler position signal associated with a longitudinal position of the traveler along the sensor assembly.

12. The flow monitoring apparatus of claim 11, wherein the plurality of magnetic sensors are spaced apart longitudinally along the narrow profile section of the printed circuit board assembly by a distance in a range of 1 millimeter to 10 millimeters.

13. The flow monitoring apparatus of claim 11, wherein the housing is at least partially conical.

14. The flow monitoring apparatus of claim 13, wherein a cross-sectional area of the interior cavity increases from the inlet to the outlet.

15. The flow monitoring apparatus of claim 11 further comprising a controller communicatively connected to the sensor assembly, the controller configured to determine a fluid flow rate based on the traveler position signal received from the sensor assembly.

16. The flow monitoring apparatus of claim 11, wherein the housing includes ferrous material.

17. The flow monitoring apparatus of claim 11, wherein the printed circuit board assembly is configured to output the traveler position signal associated with a longitudinal position of the traveler along the casing.

18. The flow monitoring apparatus of claim 11, wherein the casing is cylindrical and extends through an opening in the traveler.

19. The flow monitoring apparatus of claim 12, wherein the traveler is cylindrical and extends about the casing.

20. A method of determining a flow rate of fluid in an agricultural fluid application system including a flow monitoring apparatus, the method comprising:
   directing the fluid through an interior cavity of a housing of the flow monitoring apparatus from an inlet of the housing to an outlet of the housing, wherein a traveler is disposed in the interior cavity and movable in relation to the housing, the traveler including at least one magnet that generates a magnetic field;
   detecting, using a sensor assembly disposed in the interior cavity between the inlet and the outlet, a longitudinal position of the traveler within the interior cavity, the sensor assembly extending longitudinally in the direction of fluid flow, the sensor assembly including a casing having a longitudinal axis, an adapter body connected to the casing, and a printed circuit board assembly including a narrow profile section positioned within an interior of the casing and a wide profile section extending beyond the adapter body, the printed circuit board assembly further including a plurality of magnetic sensors spaced longitudinally along the narrow profile section of the printed circuit board assembly, the adapter body configured to releasably connect to one of the inlet and the outlet of the housing such that the casing extends into the interior cavity and the longitudinal axis is substantially parallel to the direction of fluid flow, the traveler being movably supported by the sensor assembly such that fluid flow through the interior cavity causes the traveler to move longitudinally along the sensor assembly;
   outputting, to a controller communicatively connected to the sensor assembly, a traveler position signal from the sensor assembly, the traveler position signal associated with a longitudinal position of the traveler along the sensor assembly; and
   determining, using the controller, a flow rate based at least in part on the longitudinal position of the traveler.

21. The method of claim 20, wherein detecting a longitudinal position of the traveler includes determining a state of at least one of the plurality of magnetic sensors.

22. The method of claim 21, wherein the traveler is positionable along the sensor assembly at an intermediate position between at least two of the plurality of magnetic sensors such that the at least two of the plurality of magnetic sensors are affected by the at least one magnet, the method further comprising identifying the at least two of the plurality of magnetic sensors that are affected by the at least one magnet when the traveler is in the intermediate position.

23. The method of claim 21 further comprising:
   identifying, using the controller, a subset of the plurality of magnetic sensors that are affected by the at least one magnet; and
   determining, using the controller, a position of the traveler within the housing based on the identified subset of magnetic sensors.

24. A method of assembling a fluid application system including a flow monitoring apparatus, the flow monitoring apparatus including a housing defining an interior cavity and including an inlet and an outlet, the method comprising:
   connecting the housing to a fluid line such that fluid enters the interior cavity through the inlet and exits the interior cavity through the outlet;
   positioning a sensor assembly within the interior cavity of the housing such that fluid flows through the interior cavity in a direction substantially parallel to a longitudinal axis of the sensor assembly, the sensor assembly including a casing, an adapter body connected to the casing, and a printed circuit board assembly including a narrow profile section positioned within an interior of the casing and a wide profile section extending beyond the adapter body, the printed circuit board assembly further including a plurality of magnetic sensors spaced longitudinally along the narrow profile section of the printed circuit board assembly, the adapter body configured to releasably connect to one of the inlet and the outlet of the housing such that the casing extends into the interior cavity and the longitudinal axis of the sensor assembly is substantially parallel to the direction of fluid flow; and
   positioning a traveler within the interior cavity such that the traveler is movably supported on the sensor assembly and such that fluid flow through the flow monitoring apparatus causes the traveler to move longitudinally along the sensor assembly, wherein the traveler includes at least one magnet that generates a magnetic field and affects each of the plurality of magnetic sensors as the traveler moves longitudinally along the sensor assembly, wherein the sensor assembly is configured to output a traveler position signal associated with a longitudinal position of the traveler along the sensor assembly.

25. The method of claim 24, wherein positioning the traveler within the interior cavity comprises positioning the traveler such that the sensor assembly extends through an opening in the traveler and the traveler extends about the sensor assembly.

26. The method of claim 24 further comprising connecting the adapter body to the housing such that the casing extends into the interior cavity.

27. The method of claim 24 further comprising connecting the sensor assembly to a controller, the controller configured to determine a fluid flow rate based on the traveler position signal received from the sensor assembly.

28. A method of retrofitting a flow monitoring apparatus of an agricultural fluid application system with a sensor assembly for monitoring fluid flow through the agricultural fluid application system, the sensor assembly including a casing having a longitudinal axis, an adapter body connected to the casing, and a traveler movable along the longitudinal axis of the casing, the method comprising:

removing a previously-installed traveler from an interior cavity defined by a housing of the flow monitoring apparatus, the housing including an inlet for fluid to enter the interior cavity and an outlet for fluid to exit the interior cavity, wherein fluid flows through the interior cavity from the inlet to the outlet;

positioning the traveler and the casing of the sensor assembly within the interior cavity such that the casing extends longitudinally in the direction of fluid flow, the traveler including at least one magnet that generates a magnetic field; and securing the sensor assembly to the housing by sealingly connecting the adapter body to one of the inlet and the outlet such that fluid flow through the interior cavity of the housing causes the traveler of the sensor assembly to move longitudinally along the casing of the sensor assembly, the sensor assembly disposed in the interior cavity between the inlet and the outlet, the sensor assembly including a printed circuit board assembly including a narrow profile section positioned within an interior of the casing and a wide profile section extending beyond the adapter body, the printed circuit board assembly further including a plurality of magnetic sensors spaced longitudinally along the narrow profile section of the printed circuit board assembly, wherein the sensor assembly is configured to output a traveler position signal associated with a longitudinal position of the traveler along the sensor assembly.

29. The method of claim 28 further comprising positioning the traveler within the interior cavity such that the traveler is movably supported on the sensor assembly, wherein the traveler activates at least one of the plurality of sensors of the sensor assembly as the traveler moves longitudinally along the sensor assembly.

30. The method of claim 28 further comprising connecting the printed circuit board assembly to a controller, wherein the printed circuit board assembly is configured to output the traveler position signal, the controller configured to determine a fluid flow rate based on the traveler position signal received from the printed circuit board assembly.

31. The system of claim 1 further comprising a controller including at least one processor communicatively connected to the printed circuit board assembly, wherein the at least one processor is configured to determine a fluid flow rate based on a traveler position signal received from the printed circuit board assembly.

* * * * *